United States Patent
Lee et al.

(10) Patent No.: US 9,503,631 B2
(45) Date of Patent: Nov. 22, 2016

(54) MOBILE TERMINAL AND CONTROL METHOD THEREOF FOR DISPLAYING IMAGE CLUSTER DIFFERENTLY IN AN IMAGE GALLERY MODE

(71) Applicant: LG ELECTRONICS INC., Seoul (KR)

(72) Inventors: Jungmin Lee, Seoul (KR); Suhjin Yi, Seoul (KR)

(73) Assignee: LG ELECTRONICS INC., Seoul (KR)

(*) Notice: Subject to any disclaimer, the term of this patent is extended or adjusted under 35 U.S.C. 154(b) by 0 days.

(21) Appl. No.: 14/619,907

(22) Filed: Feb. 11, 2015

(65) Prior Publication Data

US 2015/0229850 A1 Aug. 13, 2015

(30) Foreign Application Priority Data

Feb. 12, 2014 (KR) ........................ 10-2014-0016218
Jun. 5, 2014 (KR) ........................ 10-2014-0068371

(51) Int. Cl.
| | |
|---|---|
| H04N 5/232 | (2006.01) |
| H04N 1/21 | (2006.01) |
| H04N 5/225 | (2006.01) |
| H04N 5/262 | (2006.01) |

(52) U.S. Cl.
CPC .......... *H04N 5/23216* (2013.01); *H04N 1/215* (2013.01); *H04N 5/2258* (2013.01); *H04N 5/23293* (2013.01); *H04N 5/2625* (2013.01)

(58) Field of Classification Search
CPC ............... H04N 5/23216; H04N 1/215; H04N 5/2258; H04N 5/23293; H04N 5/2625; H04N 5/23229; H04N 5/23232; H04N 1/2133
See application file for complete search history.

(56) References Cited

U.S. PATENT DOCUMENTS

| | | | | |
|---|---|---|---|---|
| 5,140,434 A | * | 8/1992 | Van Blessinger | H04N 5/907 360/5 |
| 7,502,107 B2 | * | 3/2009 | Mohanty | G21K 1/006 356/317 |
| 2007/0082327 A1 | * | 4/2007 | Adams | G01N 33/5008 435/4 |
| 2007/0146714 A1 | * | 6/2007 | Mohanty | G21K 1/006 356/432 |
| 2009/0237502 A1 | * | 9/2009 | Maiya | G02B 21/367 348/79 |
| 2011/0293578 A1 | * | 12/2011 | Busch | C12N 5/0607 424/93.7 |
| 2012/0011473 A1 | * | 1/2012 | Ohkubo | G06F 17/30274 715/838 |

(Continued)

*Primary Examiner* — Nicholas Giles
(74) *Attorney, Agent, or Firm* — Birch, Stewart, Kolasch & Birch, LLP

(57) ABSTRACT

A mobile terminal including a display unit; at least one camera; and a controller configured to perform first and second continuous shooting operations using the at least one camera for capturing a plurality of first images in the first continuous shooting operation and capturing a plurality of second images in the second continuous shooting operation, generate a combined image by combining a first image cluster generated from the plurality of first images and a second image cluster generated from the plurality of second images, and distinctively display the first and the second image clusters on the display unit.

18 Claims, 45 Drawing Sheets

(56) References Cited

U.S. PATENT DOCUMENTS

| | | | |
|---|---|---|---|
| 2012/0184846 A1* | 7/2012 | Izatt | G02B 21/0012 600/425 |
| 2012/0242851 A1* | 9/2012 | Fintel | H04N 5/23222 348/221.1 |
| 2012/0242853 A1* | 9/2012 | Jasinski | H04N 5/23232 348/222.1 |
| 2012/0243802 A1* | 9/2012 | Fintel | H04N 5/2625 382/284 |
| 2012/0257071 A1* | 10/2012 | Prentice | H04N 5/2625 348/220.1 |
| 2014/0307980 A1* | 10/2014 | Hilt | G06T 11/60 382/284 |
| 2015/0055890 A1* | 2/2015 | Lundin | G06F 17/30274 382/306 |

\* cited by examiner

IC1

(a)

IC1

(b)

IC1

IC2

AI (a)

(b)

(a)

(b)

(a)

(b)

(a)

(b)

(a)

(b)

(a)

(b)

(a)

(b)

(a)

(b)

(a)

(b)

(a)

(b)

(a)

(b)

(a)

(b)

(a)

(b)

(a)

(b)

(a)

(b)

ns of a combined image according to one embodiment of the present invention;

MOBILE TERMINAL AND CONTROL METHOD THEREOF FOR DISPLAYING IMAGE CLUSTER DIFFERENTLY IN AN IMAGE GALLERY MODE

CROSS-REFERENCE TO RELATED APPLICATIONS

Pursuant to 35 U.S.C. §119(a), this application claims the benefit of earlier filing date and right of priority to Korean Patent Application No. 10-2014-0068371, filed on Jun. 5, 2014, and No. 10-2014-0016218 filed on Feb. 12, 2014, the contents of which are incorporated by reference herein in their entirety.

BACKGROUND OF THE INVENTION

1. Field of the Invention

The present invention relates to a mobile terminal and more specifically, to a mobile terminal capable of easily distinguishing a plurality of continuous shooting by indicating distinctively first and second image clusters in a combined image made by combining together the first and the second image cluster obtained through the plurality of continuous shooting; and a control method for the mobile terminal.

2. Discussion of the Related Art

As functions of terminals such as personal computers, laptop computers, cellular phones diversify, the terminals become multimedia players having multiple functions for capturing pictures or moving images, playing music, moving image files and games and receiving broadcasting programs. Terminals can be categorized as mobile terminals and stationary terminals.

The mobile terminals can be further comprised of handheld terminals and vehicle mount terminals. Related art terminals including mobile terminals provide an increasing number of complex and various functions. However, the user interfaces have also increased in complexity and are often cumbersome or difficult to use.

SUMMARY OF THE INVENTION

Accordingly, an object of the present invention is to address the above-noted and other problems.

To achieve these and other advantages and in accordance with the purpose of the present invention, as embodied and broadly described herein, the present invention provides in one aspect a mobile terminal capable of easily distinguishing a plurality of continuous shooting from each other by indicating distinctively first and second image clusters in a combined image made by combining together the first and the second image cluster obtained through the plurality of continuous shooting; and a control method for the mobile terminal.

Further scope of applicability of the present invention will become apparent from the detailed description given hereinafter. However, it should be understood that the detailed description and specific examples, while indicating preferred embodiments of the invention, are given by illustration only, since various changes and modifications within the spirit and scope of the invention will become apparent to those skilled in the art from this detailed description.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention.

DETAILED DESCRIPTION OF THE INVENTION

Arrangements and embodiments may now be described more fully with reference to the accompanying drawings, in which embodiments may be shown. Embodiments may, however, be embodied in many different forms and should not be construed as being limited to embodiments set forth herein; rather, embodiments may be provided so that this disclosure will be thorough and complete, and will fully convey the concept to those skilled in the art.

Figure 1:
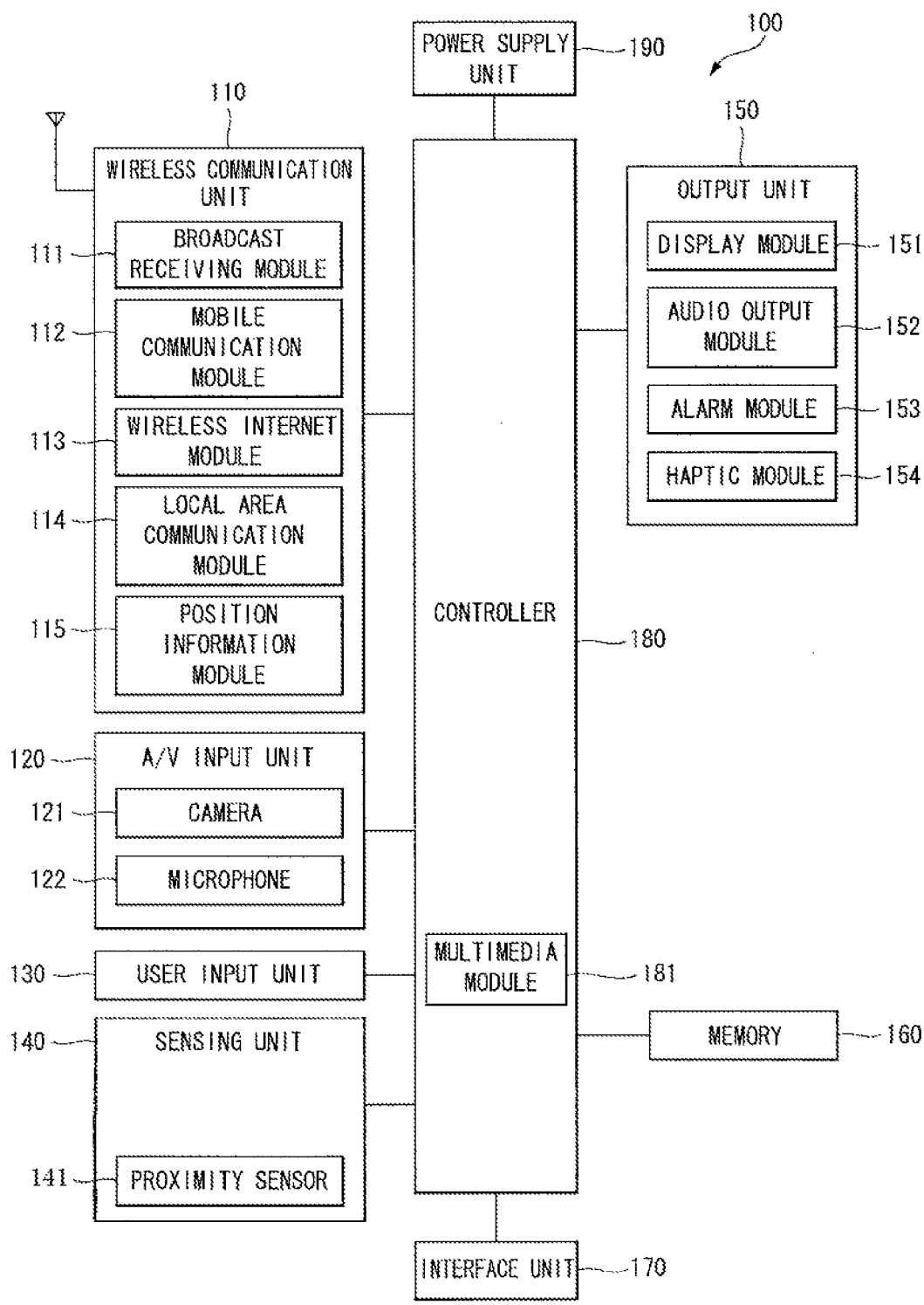
FIG. 1 is a block diagram of a mobile terminal according to an embodiment.

A mobile terminal may be described below with reference to the accompanying drawings. In the following description, suffixes "module" and "unit" may be given to components of the mobile terminal in consideration of only facilitation of description and do not have meanings or functions discriminated from each other. The mobile terminal may include a cellular phone, a smart phone, a laptop computer, a digital broadcasting terminal, personal digital assistants (PDA), a portable multimedia player (PMP), a navigation system and/or so on. FIG. 1 is a block diagram of a mobile terminal according to an embodiment. Other embodiments, configurations and arrangements may also be provided.

As shown, the mobile terminal 100 may include a wireless communication unit 110 (or radio communication unit), an audio/video (A/V) input unit 120, a user input unit 130, a sensing unit 140, an output unit 150, a memory 160, an interface 170, a controller 180, and a power supply 190. The components shown in FIG. 1 may be essential parts and/or a number of components included in the mobile terminal 100 may vary. Components of the mobile terminal 100 may now be described.

The wireless communication unit 110 may include at least one module that enables radio communication between the mobile terminal 100 and a radio communication system or between the mobile terminal 100 and a network in which the mobile terminal 100 is located. For example, the wireless communication unit 110 may include a broadcasting receiving module 111, a mobile communication module 112, a wireless Internet module 113, a short range communication module 114 (or local area communication module), and a location information module 115 (or position information module).

The broadcasting receiving module 111 may receive broadcasting signals and/or broadcasting related information from an external broadcasting management server through a broadcasting channel. The broadcasting channel may include a satellite channel and a terrestrial channel, and the broadcasting management server may be a server that generates and transmits broadcasting signals and/or broadcasting related information or a server that receives previously created broadcasting signals and/or broadcasting related information and transmits the broadcasting signals and/or broadcasting related information to a terminal.

The broadcasting signals may include not only TV broadcasting signals, radio broadcasting signals, and data broadcasting signals but also signals in the form of a combination of a TV broadcasting signal and a radio broadcasting signal. The broadcasting related information may be information on a broadcasting channel, a broadcasting program or a broadcasting service provider, and may be provided even through a mobile communication network. In the latter case, the broadcasting related information may be received by the mobile communication module 112.

The broadcasting related information may exist in various forms. For example, the broadcasting related information may exist in the form of an electronic program guide (EPG) of a digital multimedia broadcasting (DMB) system or in the form of an electronic service guide (ESG) of a digital video broadcast-handheld (DVB-H) system. The broadcasting receiving module 111 may receive broadcasting signals using various broadcasting systems. More particularly, the broadcasting receiving module 111 may receive digital broadcasting signals using digital broadcasting systems such as a digital multimedia broadcasting-terrestrial (DMB-T) system, a digital multimedia broadcasting-satellite (DMB-S) system, a media forward link only (MediaFLO) system, a DVB-H and integrated services digital broadcast-terrestrial (ISDB-T) systems. The broadcasting receiving module 111 may receive signals from broadcasting systems providing broadcasting signals other than the above-described digital broadcasting systems.

The broadcasting signals and/or broadcasting related information received through the broadcasting receiving module 111 may be stored in the memory 160. The mobile communication module 112 may transmit/receive a radio signal to/from at least one of a base station, an external terminal and a server on a mobile communication network.

The radio signal may include a voice call signal, a video telephony call signal or data in various forms according to transmission and reception of text/multimedia messages.

The wireless Internet module 113 may correspond to a module for wireless Internet access and may be included in the mobile terminal 100 or may be externally attached to the mobile terminal 100. Wireless LAN (WLAN or Wi-Fi), wireless broadband (Wibro), world interoperability for microwave access (Wimax), high speed downlink packet access (HSDPA) and so on may be used as a wireless Internet technique.

The short range communication module 114 may correspond to a module for short range communication. Further, Bluetooth®, radio frequency identification (RFID), infrared data association (IrDA), ultra wideband (UWB) and/or Zig-Bee® may be used as a short range communication technique.

The location information module 115 may confirm or obtain a location or a position of the mobile terminal 100. The location information module 115 may obtain position information by using a global navigation satellite system (GNSS). The GNSS is a terminology describing a radio navigation satellite system that revolves around the earth and transmits reference signals to predetermined types of radio navigation receivers such that the radio navigation receivers can determine their positions on the earth's surface or near the earth's surface. The GNSS may include a global positioning system (GPS) of the United States, Galileo of Europe, a global orbiting navigational satellite system (GLONASS) of Russia. COMPASS of China, and a quasi-zenith satellite system (QZSS) of Japan, for example.

A global positioning system (GPS) module is a representative example of the location information module 115. The GPS module may calculate information on distances between one point or object and at least three satellites and information on a time when distance information is measured and apply trigonometry to the obtained distance information to obtain three-dimensional position information on the point or object according to latitude, longitude and altitude at a predetermined time.

A method of calculating position and time information using three satellites and correcting the calculated position and time information using another satellite may also be used. Additionally, the GPS module may continuously calculate a current position in real time and calculate velocity information using the location or position information.

The A/V input unit 120 may input (or receive) an audio signal and/or a video signal. The A/V input unit 120 may include a camera 121 and a microphone 122. The camera. 121 may process image frames of still images or moving images obtained by an image sensor in a video telephony mode or a photographing mode. The processed image frames may be displayed on a display 151, which may be a touch screen. The image frames processed by the camera 121 may be stored in the memory 160 or may be transmitted to an external device through the wireless communication unit 110. The mobile terminal 100 may also include at least two cameras 121.

The microphone 122 may receive an external audio signal in a call mode, a recording mode and/or a speech recognition mode, and the microphone 122 may process the received audio signal into electric audio data. The audio data may then be converted into a form that can be transmitted to a mobile communication base station through the mobile communication module 112 and output in the call mode. The microphone 122 may employ various noise removal algorithms (or noise canceling algorithm) for removing or reducing noise generated when the external audio signal is received.

The user input unit 130 may receive input data for controlling operation of the mobile terminal 100 from a user. The user input unit 130 may include a keypad, a dome switch, a touch pad (constant voltage/capacitance), a jog wheel, a jog switch and/or so on.

The sensing unit 140 may sense a current state of the mobile terminal 100, such as an open/close state of the mobile terminal 100, a position of the mobile terminal 100, whether a user touches the mobile terminal 100, a direction of the mobile terminal 100, and acceleration/deceleration of the mobile terminal 100, and the sensing unit 140 may generate a sensing signal for controlling operation of the mobile terminal 100. For example, in an example of a slide phone, the sensing unit 140 may sense whether the slide phone is opened or closed. Further, the sensing unit 140 may sense whether the power supply 190 supplies power and/or whether the interface unit 170 is connected to an external device. The sensing unit 140 may also include a proximity sensor 141. The sensing unit 140 may sense a motion of the mobile terminal 100.

The output unit 150 may generate visual, auditory and/or tactile output, and the output unit 150 may include the display 151, an audio output module 152, an alarm module 153 and a haptic module 154. The display 151 may display information processed by the mobile terminal 100. The display 151 may display a user interface (UI) and/or a graphic user interface (GUI) related to a telephone call when the mobile terminal 100 is in the call mode. The display 151 may also display a captured and/or received image, a UI or a GUI when the mobile terminal 100 is in the video telephony mode or the photographing mode.

The display 151 may include at least one of a liquid crystal display, a thin film transistor liquid crystal display, an organic light-emitting diode display, a flexible display and/or a three-dimensional display. The display 151 may be of a transparent type or a light transmissive type. That is, the display 151 may include a transparent display. The transparent display may be a transparent liquid crystal display. A rear structure of the display 151 may also be of a light transmissive type. Accordingly, a user may see an object located behind the body (of the mobile terminal 100) through the transparent area of the body of the mobile terminal 100 that is occupied by the display 151.

The mobile terminal 100 may also include at least two displays 151. For example, the mobile terminal 100 may include a plurality of displays 151 that are arranged on a single face at a predetermined distance or integrated displays. The plurality of displays 151 may also be arranged on different sides. When the display 151 and a sensor sensing touch (hereafter referred to as a touch sensor) form a layered structure that is referred to as a touch screen, the display 151 may be used as an input device in addition to an output device. The touch sensor may be in the form of a touch film, a touch sheet, and/or a touch pad, for example.

The touch sensor may convert a variation in pressure applied to a specific portion of the display 151 or a variation in capacitance generated at a specific portion of the display 151 into an electric input signal. The touch sensor may sense pressure of touch as well as position and area of the touch. When the user applies a touch input to the touch sensor, a signal corresponding to the touch input may be transmitted to a touch controller. The touch controller may then process the signal and transmit data corresponding to the processed signal to the controller 180. Accordingly, the controller 180 can detect a touched portion of the display 151.

The proximity sensor 141 (of the sensing unit 140) may be located in an internal region of the mobile terminal 100, surrounded by the touch screen, and/or near the touch screen. The proximity sensor 141 may sense an object approaching a predetermined sensing face or an object located near the proximity sensor 141 using an electromagnetic force or infrared rays without having mechanical contact. The proximity sensor 141 may have a lifetime longer than a contact sensor and may thus have a wide application in the mobile terminal 100.

The proximity sensor 141 may include a transmission type photo-electric sensor, a direct reflection type photo-electric sensor, a mirror reflection type photo-electric sensor, a high-frequency oscillating proximity sensor, a capacitive proximity sensor, a magnetic proximity sensor, and/or an infrared proximity sensor. A capacitive touch screen may be constructed such that proximity of a pointer is detected through a variation in an electric field according to the proximity of the pointer. The touch screen (touch sensor) may be classified as a proximity sensor 141.

For ease of explanation, an action of the pointer approaching the touch screen without actually touching the touch screen may be referred to as a proximity touch and an action of bringing the pointer into contact with the touch screen may be referred to as a contact touch. The proximity touch point of the pointer on the touch screen may correspond to a point of the touch screen at which the pointer is perpendicular to the touch screen. The proximity sensor 141 may sense the proximity touch and a proximity touch pattern (e.g., a proximity touch distance, a proximity touch direction, a proximity touch velocity, a proximity touch time, a proximity touch position, a proximity touch moving state, etc.). Information corresponding to the sensed proximity touch action and proximity touch pattern may then be displayed on the touch screen.

The audio output module 152 may output audio data received from the wireless communication unit 110 or stored in the memory 160 in a call signal receiving mode, a telephone call mode or a recording mode, a speech recognition mode and a broadcasting receiving mode. The audio output module 152 may output audio signals related to functions, such as a call signal incoming tone and a message incoming tone, performed in the mobile terminal 100. The audio output module 152 may include a receiver, a speaker, a buzzer, and/or the like. The audio output module 152 may output sounds through an earphone jack. The user may hear the sounds by connecting an earphone to the earphone jack.

The alarm module 153 may output a signal for indicating generation of an event of the mobile terminal 100. For example, an alarm may be generated when receiving a call signal, receiving a message, inputting a key signal, and/or inputting a touch. The alarm module 153 may also output signals in forms different from video signals or audio signals, for example, a signal for indicating generation of an event through vibration. The video signals and/or the audio signals may also be output through the display 151 or the audio output module 152.

The haptic module 154 may generate various haptic effects that the user can feel. One example of the haptic effects is vibration. An intensity and/or pattern of vibration generated by the haptic module 154 may also be controlled. For example, different vibrations may be combined and output or may be sequentially output. The haptic module 154 may generate a variety of haptic effects including an effect of stimulus according to an arrangement of pins vertically moving against a contact skin surface, an effect of stimulus according to a jet force or sucking force of air through a jet hole or a sucking hole, an effect of stimulus of rubbing the skin, an effect of stimulus according to contact of an electrode, an effect of stimulus using an electrostatic force, and an effect according to a reproduction of cold and warmth using an element capable of absorbing or radiating heat in addition to vibrations. The haptic module 154 may not only transmit haptic effects through direct contact but may also allow the user to feel haptic effects through a kinesthetic sense of the user's fingers or arms. The mobile terminal 100 may also include a plurality of haptic modules 154.

The memory 160 may store a program for operations of the controller 180 and/or temporarily store input/output data such as a phone book, messages, still images, and/or moving images. The memory 160 may also store data about vibrations and sounds in various patterns that are output from when a touch input is applied to the touch screen. The memory 160 may include at least a flash memory, a hard disk type memory, a multimedia card micro type memory, a card type memory, such as SD or XD memory, a random access memory (RAM), a static RAM (SRAM), a read-only memory (ROM), an electrically erasable programmable ROM (EEPROM), a programmable ROM (PROM) magnetic memory, a magnetic disk and/or an optical disk. The mobile terminal 100 may also operate in relation to a web storage that performs a storing function of the memory 160 on the Internet.

The interface unit 170 may serve as a path to external devices connected to the mobile terminal 100. The interface unit 170 may receive data from the external devices or power and transmit the data or power to internal components of the mobile terminal 100 or transmit data of the mobile terminal 100 to the external devices. For example, the interface unit 170 may include a wired/wireless headset port, an external charger port, a wired/wireless data port, a memory card port, a port for connecting a device having a user identification module, an audio I/O port, a video I/O port, and/or an earphone port.

The interface unit 170 may also interface with a user identification module that is a chip that stores information for authenticating authority to use the mobile terminal 100. For example, the user identification module may be a user identify module (UIM), a subscriber identify module (SIM) and/or a universal subscriber identify module (USIM). An identification device (including the user identification module) may also be manufactured in the form of a smart card. Accordingly, the identification device may be connected to the mobile terminal 100 through a port of the interface 170.

The interface unit 170 may also be a path through which power from an external cradle is provided to the mobile terminal 100 when the mobile terminal 100 is connected to the external cradle or a path through which various command signals input by the user through the cradle are transmitted to the mobile terminal 100. The various command signals or power input from the cradle may be used as signals for confirming whether the mobile terminal 100 is correctly set in the cradle.

The controller 180 can control overall operations of the mobile terminal 100. For example, the controller 180 can perform control and processing for voice communication, data communication and/or video telephony. The controller 180 can also include a multimedia module 181 for playing multimedia. The multimedia module 181 may be included in the controller 180 or may be separated from the controller 180.

The controller 180 can perform a pattern recognition process capable of recognizing handwriting input or picture-drawing input applied to the touch screen as characters or images. The power supply 190 may receive external power and internal power and provide power required for operations of the components of the mobile terminal 100 under control of the controller 180.

According to a hardware implementation, embodiments may be implemented using at least one of application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, and/or electrical units for executing functions. Embodiments may be implemented by the controller 180.

According to a software implementation, embodiments such as procedures or functions may be implemented with a separate software module that executes at least one function or operation. Software codes may be implemented according to a software application written in an appropriate software language. The software codes may be stored in the memory 160 and executed by the controller 180.

Figure 2:
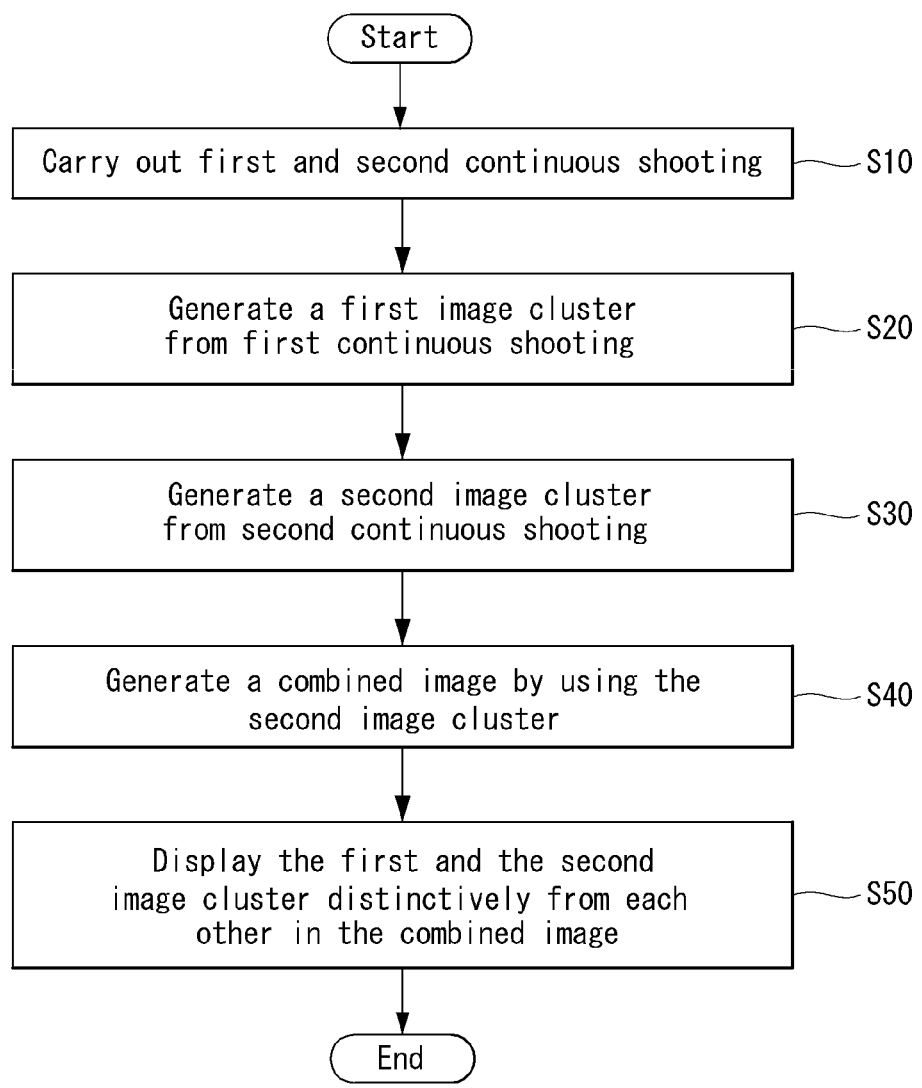
FIG. 2 is a flow diagram illustrating operation of the mobile terminal of FIG. 1.

FIG. 2 is a flow diagram illustrating operation of the mobile terminal of FIG. 1. As shown, the controller 180 of a mobile terminal 100 according to one embodiment of the present invention can perform first and second continuous shooting (SI 0). The first and the second continuous shooting can be performed by the camera 121 of the mobile terminal 100. The camera 121 can be disposed on at least one surface of the mobile terminal 100. For example, the camera 121 can include a front camera (121a of FIG. 3) disposed on the front surface of the mobile terminal 100 and a rear camera (121b of FIG. 3) disposed on the rear surface thereof. In most instances, the rear camera (121b of FIG. 3) can be used for shooting an external scene. However, unless intended for a particular purpose, the front camera (121a of FIG. 3) and the rear camera (121b of FIG. 3) are commonly referred to as the camera 121.

The first and the second continuous shooting can indicate the operation of taking a plurality of photographs within a predetermined time period. For example, continuous shooting can refer to the operation of capturing 20 still images within one second. The time period for continuous shooting and/or the number of times for continuous shooting can be changed. A plurality of continuous shooting can be performed at regular intervals. For example, first continuous shooting may be performed for a predetermined time period, and after a predetermined interval, second continuous shooting may be performed again for a predetermined time period.

The first and the second continuous shooting can be performed by the user's operation and/or a control signal of the controller 180. For example, the first continuous shooting may be performed while a touch input on a shooting button continues to last, and the second continuous shooting may be performed while a touch input again continues to last on the shooting button.

The controller 180 generates a first image cluster due to the first continuous shooting (S20) and a second image cluster due to the second continuous shooting (S30). An image cluster denotes a set of images created from a single trial of continuous shooting. A predetermined number of images can be generated from a single trial of continuous shooting. For example, five successive images with a time difference one after another can be generated. The five images may differ slightly from each other due to a small amount of time difference, but since the time difference is not large, a great portion of the images can overlap with each other.

The controller 180 can manage the images generated from a single trial of continuous shooting as one set. The controller 180 can manage the images generated from a single trial of continuous shooting as one image cluster. For example, images obtained from a single trial of continuous shooting can be used to produce a single image by combining overlapping portions between the images. In what follows, a single image formed by the aforementioned process is called an image cluster. Therefore, if continuous shooting is performed two times, two image clusters are generated.

The controller 180 then generates a combined image by using first and second image clusters (S40). As described above, the first and the second image cluster correspond to a set of images captured by first and second continuous shooting, respectively. The controller 180 can combined the first and the second image cluster together. For example, the controller 180 can create a combined image by combining an overlapping portion between the first and the second image cluster. Though described in detail in the corresponding part of this document, a combined image can provide an animation effect as if a photographed subject actually moves while in fact, the combined image is not a video.

The controller 180 then indicates distinctively the first and the second image cluster in the combined image (S50). A combined image can be formed by a set of images generated from a plurality of continuous shooting. For example, a combined image can be a set of images from the first and the second continuous shooting. The controller 180 can indicate distinctively the first and the second image cluster in the combined image. Therefore, the user watching the combined image displayed can intuitively distinguish the part due to the first continuous shooting from the part due to the second continuous shooting.

Figure 3:
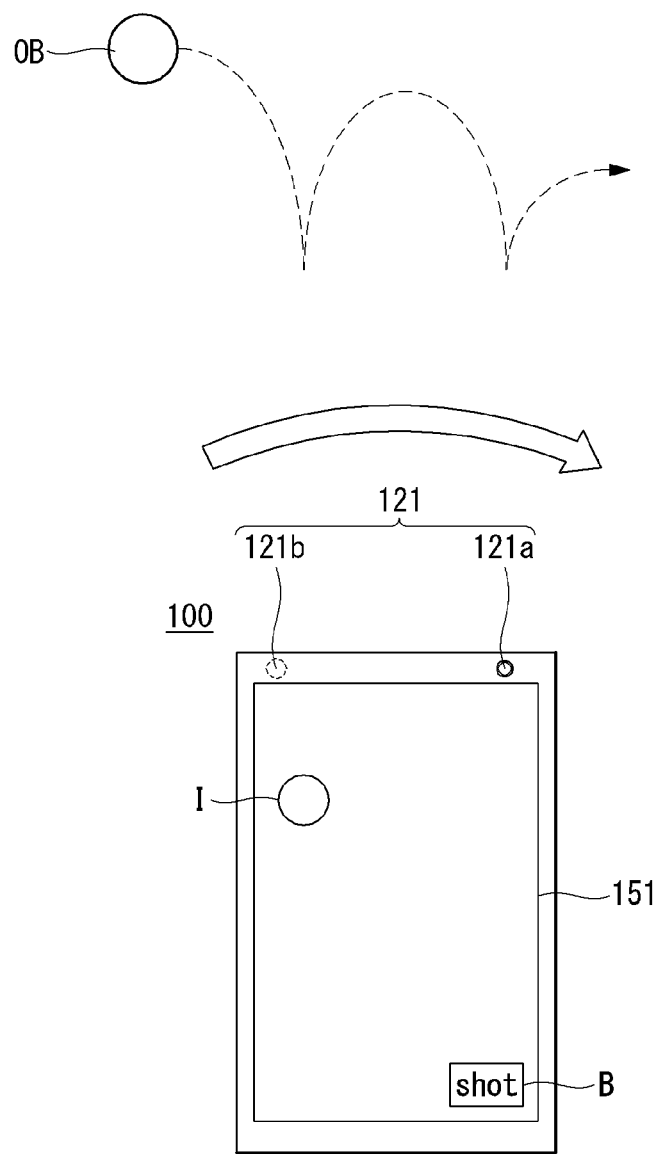
FIGS. 3 to 5 illustrate continuous shooting of the mobile terminal of FIG. 1.
Figure 4:
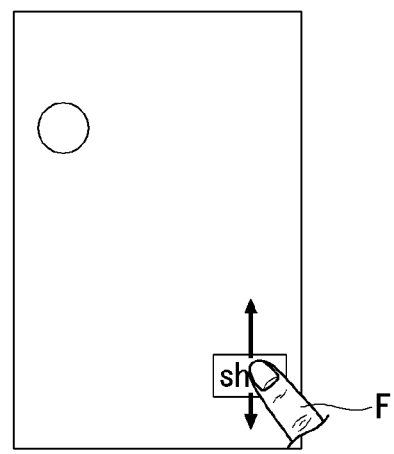
Figure 4:
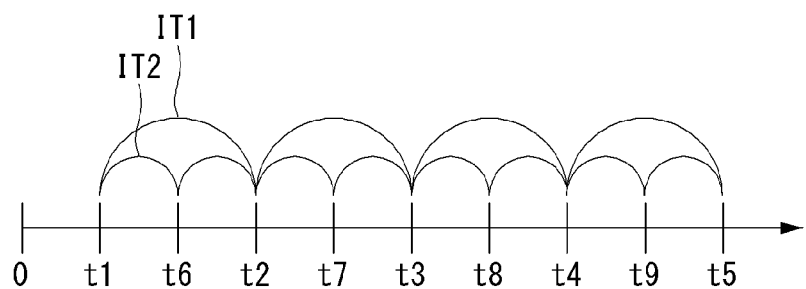
Figure 5:
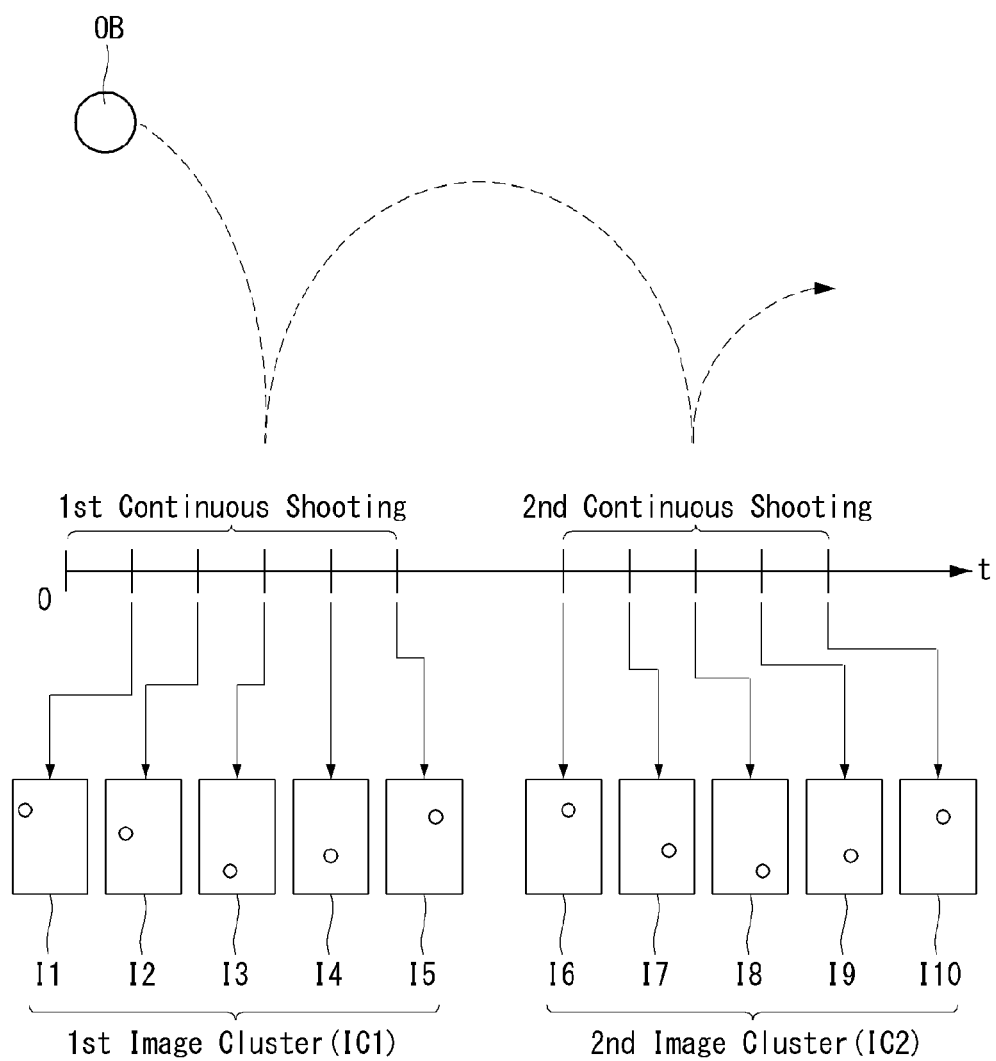

Next, FIGS. 3 to 5 illustrate continuous shooting of the mobile terminal of FIG. 1. As discussed above, the mobile terminal 100 according to one embodiment of the present invention can obtain consecutive still images by using the camera 121. As shown in FIG. 3, the user can take a picture of an object OB by using the mobile terminal 100. For example, the user may shoot a ball falling freely toward the surface and bouncing off the surface several times.

The user can photograph the object OB by using the rear camera 121b. When the rear camera 121b is employed, the user can check captured images through the display unit 151 simultaneously with photographing of the object OB. Further, continuous shooting can be performed when the user touches a first button B displayed on the display unit 151. For example, continuous shooting can be performed while the first button B is being pressed.

Continuous shooting can be initiated when the user touches the first button B. However, if a predetermined time period and/or a predetermined number of times for photographing is exceeded, continuous shooting can be automatically terminated even if a touch input continues to last. In addition, continuous shooting can be performed multiple, times in a discontinuous manner. For example, when the user touches the first button B to initiate first continuous shooting and touches the first button B again, second continuous shooting can be performed, which is displaced slightly from the first continuous shooting along the time scale.

In addition, the controller 180 can manage a plurality of continuous shooting as a single trial of continuous shooting. For example, the second continuous shooting performed within a predetermined time period after the first continuous shooting and with respect to the same object and/or in the same place can be combined together with the first continuous shooting to produce a single combined image.

As shown in FIG. 4, an operation of continuous shooting can be changed according to the user's selection. As shown in FIG. 4(a), a 'Shot' button can be displayed on the display unit. If the user selects the 'Shot' button by using his or her finger F, continuous shooting can be initiated. For example, if the user touches the Shot button for less than a predetermined time period, image capture is performed. If the Shot button is touched for longer than a predetermined time period, continuous shooting can be performed.

The controller 180 can set attributes of continuous shooting according to how the Shot button is touched. For example, if the user drags the Shot button upward or downward while touching the Shot button, the controller 180 can change the speed and the time period of continuous shooting can be changed according to degree of dragging.

As shown in FIG. 4(b), continuous shooting can be performed with a first interval IT1 for a normal operating condition. In other words, shooting can be performed with t1, t2, t3, t4, or t5 intervals. Receiving a drag motion of the user on the Shot button, the controller 180 can change a shooting interval. For example, shooting can be performed with a second interval IT2 Which is shorter than the first interval IT1. If shooting is performed with the second interval IT2, more images can be obtained within the same time period.

As shown in FIG. 5, first to fifth images (I1 to I5) are obtained from first continuous shooting while sixth to tenth images (I6 to I10) are obtained from second continuous shooting. The controller 180 forms a first image cluster (IC1) by using the first to the fifth image (I1 to I5) due to the first continuous shooting and a second image cluster IC2 by using the sixth to the tenth image (I6 to I10) due to the second continuous shooting. The first and the second image cluster IC1, IC2 will be described in more detail in the corresponding part of this document.

Figure 6:
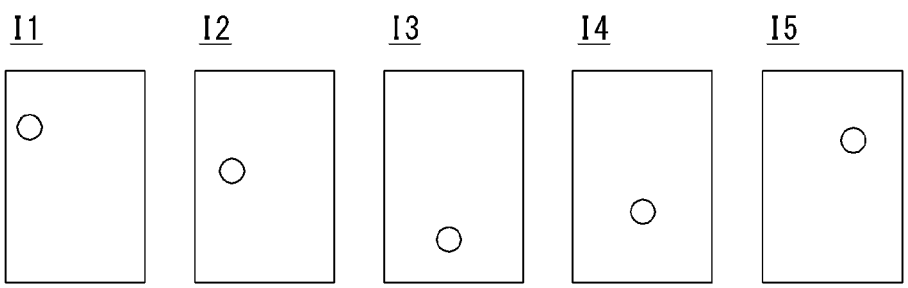
FIGS. 6 to 8 illustrate generation of an image cluster in the mobile terminal of FIG. 1.
Figure 6:
Figure 6:
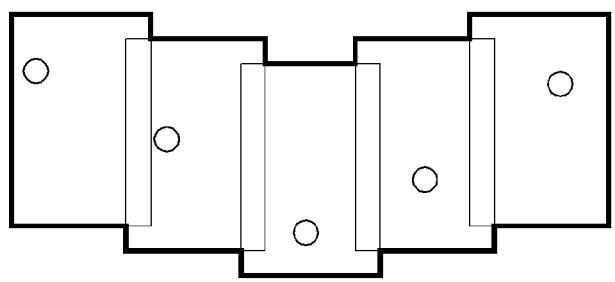
Figure 7:
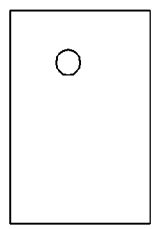
Figure 7:
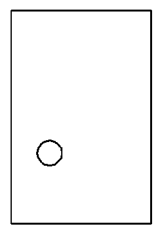
Figure 7:
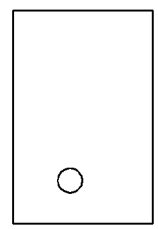
Figure 7:
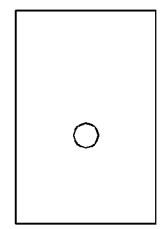
Figure 7:
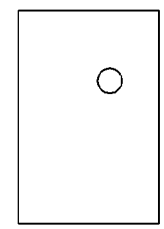
Figure 7:
Figure 7:
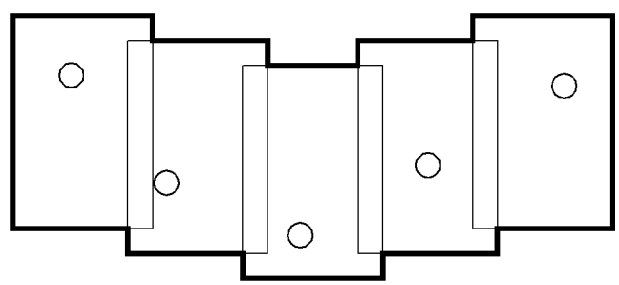
Figure 8:
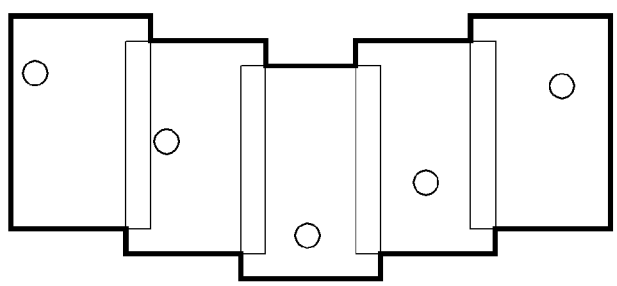
Figure 8:
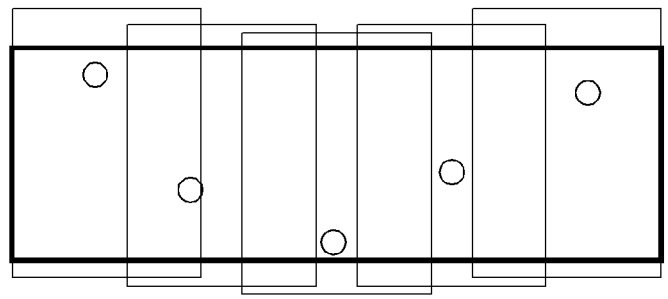

FIGS. 6 to 8 illustrate generation of an image cluster in the mobile terminal of FIG. 1. As described above, the controller 180 according to one embodiment of the present invention can generate an image cluster by using images obtained through continuous shooting. As shown in FIG. 6, the controller 180 can generate the first image cluster IC1 by using first to fifth images (I1 to I5) obtained from the first continuous shooting. The first image cluster IC1 can be generated by combining overlapping portions among the first to the fifth image (I1 to I5).

As described above, the first to fifth image (I1 to I5) can be the images obtained from shooting with a relatively short interval. Therefore, neighboring images such as the first I1 and the second image I2; and the second I2 and the third image I3 can have an overlapping area between them. The controller 180 can generate one image by combining the overlapping areas, and the generated image will be called a first image cluster IC1.

As shown in FIG. 7, the controller 180 can generate the second image cluster IC2 by using sixth to tenth images (I6 to I10) obtained from the second continuous shooting. Since the process for generating the second image cluster IC2 is similar to that for the first image cluster IC1, detailed descriptions will be omitted. As shown in FIG. 8, the controller 180 can generate an image cluster in various ways. In what follows, a method for generating an image cluster will be described with respect to a first image cluster IC1. However, it should be noted that the same method can be applied to generate a second image cluster IC2.

As shown in FIG. 8(a), the first image cluster IC1 can be the image formed by combining overlapping areas among the first to the fifth image (I1 to I5). Therefore, the upper part and/or the lower part of the first image cluster may exhibit an irregular shape. In other words, depending on shooting positions, a first image cluster IC1 of an irregular shape in the upper and lower part thereof can be generated. As shown in FIG. 8(b), the controller 180 can generate a first image cluster IC1, the upper part and/or the lower part of which has been trimmed.

For example, the actual size of the first to the fifth image (I1 to I5) can be larger than the screen size of the display unit 151. Therefore, with respect to a photographed object, the first to the fifth image (I1 to I5) can have a large margin for trimming in the upper and/or lower part of the images. By editing the upper and/or lower part of the first to the fifth image (I1 to I5) which have a trimming margin, the controller 180 can generate a first image cluster IC1 which actually has a rectangular shape.

Figure 9:
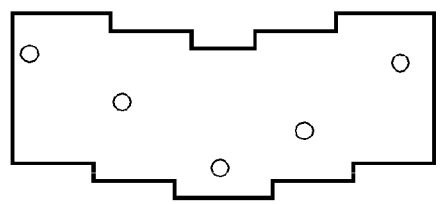
FIGS. 9 and 10 illustrate generation of a combined image in the mobile terminal of FIG. 1.
Figure 9:
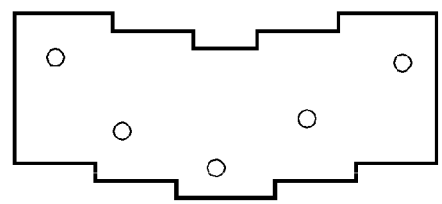
Figure 9:
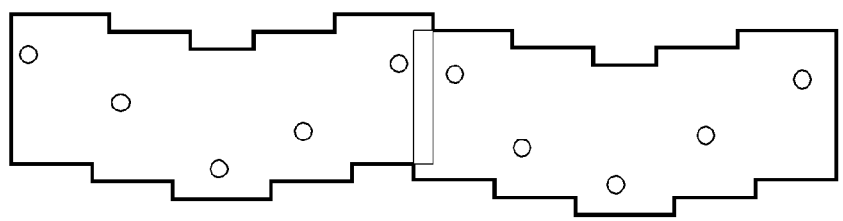
Figure 10:
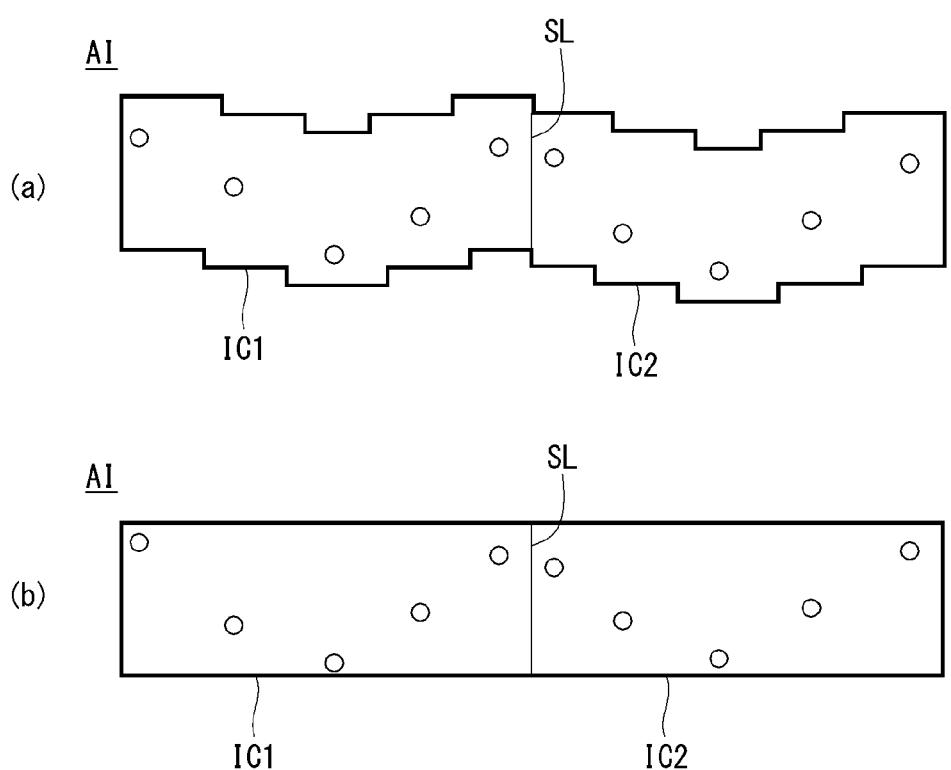

FIGS. 9 and 10 illustrate generation of a combined image in the mobile terminal of FIG. 1. As shown in the figures, the controller 180 according to one embodiment of the present invention can generate a combined image combining a plurality of image clusters. Therefore, since the user is enabled to manage the images obtained from a plurality of continuous shooting as a single image, he or she can play or edit the images obtained from continuous shooting more conveniently.

As shown in FIG. 9, the controller 180 can generate a combined image AI by combining a first image cluster IC1 and a second image cluster IC2. A combined image AI can be formed by overlapping common portions of the first IC1 and the second image cluster IC2. For example, the last part of the first image cluster IC1 and the first part of the second image cluster IC2 may overlap with each other. The overlap of this kind is more apparent if the time and/or the place at which the first continuous shooting ends is adjacent to the time and/or the place at which the second continuous shooting starts.

As shown in FIG. 10(a), the controller 180 can display a boundary between the first image cluster IC1 and the second image cluster IC2 on the combined image AI. For example, an identifier SL can be displayed between the first and the second image cluster IC1, IC2. An identifier SL allows the user to intuitively distinguish the first image cluster IC1 from the second image cluster IC2. Therefore, the user may more clearly carry out the operation such as playing the part corresponding to the first image cluster IC1 separately from the combined image AI or editing only the part corresponding to the first image cluster IC1. For example, in case the user touches the region corresponding to the first cluster image IC1 divided by the separation line, an operation such as playing only the image corresponding to the first image cluster IC1 rather than the Whole combined image AI can be performed.

As shown in FIG. 10(b), the controller 180 can display a separation line (SL) on a combined image AI composed in a rectangular shape. The identifier SL can be composed in various ways. For example, in addition to a line type displayed along the boundary between the first IC1 and the second image cluster IC2, an identifier which renders at least one of color, brightness, or chrominance of the first IC1 and the second image cluster IC2 region different from the other is also possible.

Figure 11A:
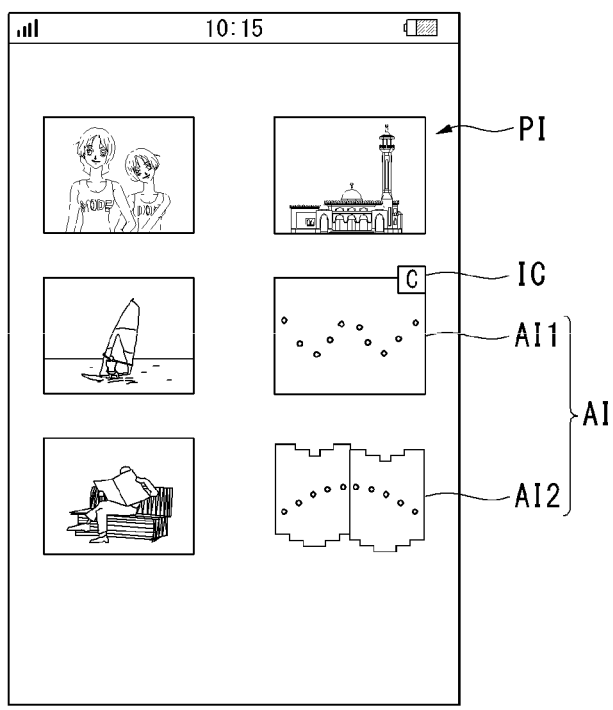
FIGS. 11A to 12 illustrate a method for displaying thumbnails of combined images created in the mobile terminal of FIG. 1.
Figure 11B:
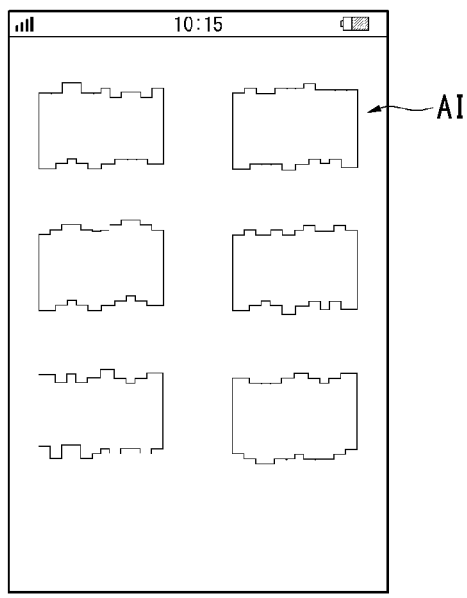
Figure 11B:
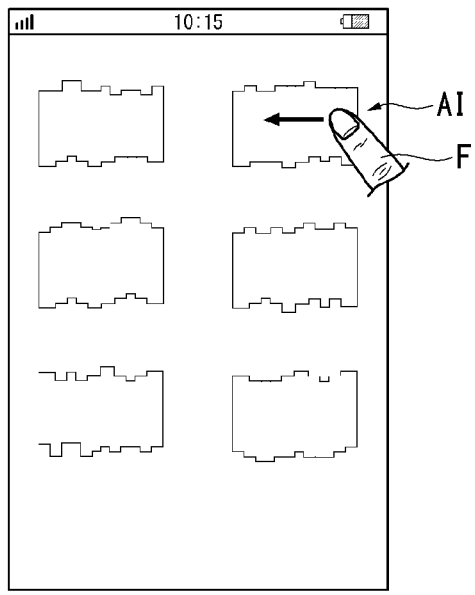
Figure 11C:
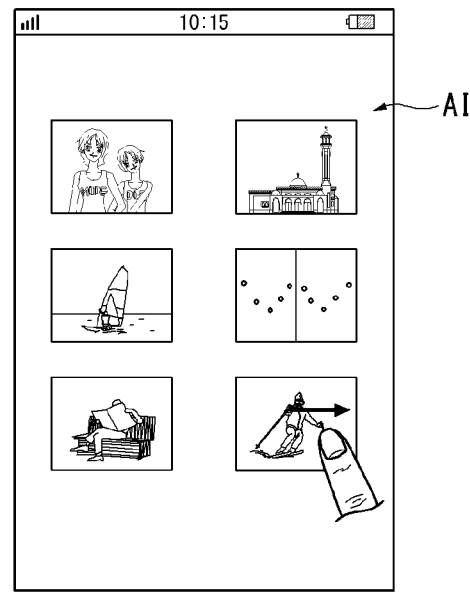
Figure 11C:
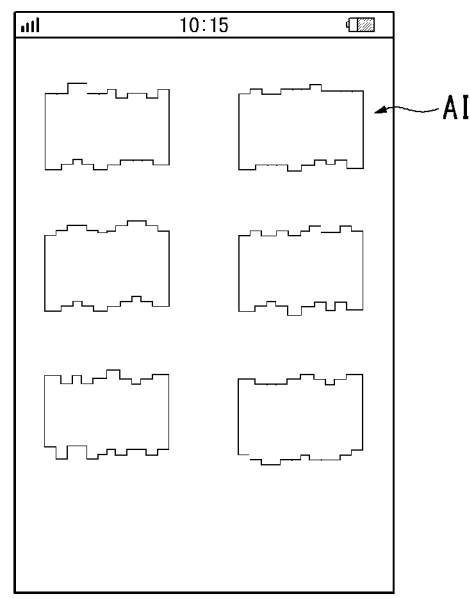
Figure 12:
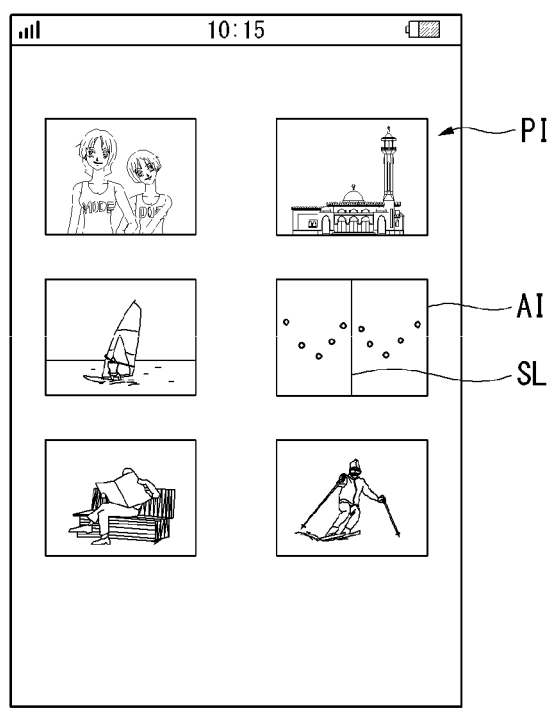

FIGS. 11A to 12 illustrate a method for displaying thumbnails of combined images created in the mobile terminal of FIG. 1. As shown in the figures, the controller 180 according to one embodiment of the present invention can display preview images (PIs) of images stored in the memory 160 of the mobile terminal 100 in the form of thumbnails. The controller 180 can display a combined image in the form of a thumbnail image.

As shown in FIG. 11A, the display unit 151 can display a plurality of preview images PIs. The preview images (PIs) can be a set of thumbnails of the images stored in the memory 160. The preview images (PIs) may include a thumbnail of a combined image AI. The controller 180 can display an identifying icon (IC) intended for easy recognition of a combined image (AI). The user, intuitively recognizing the combined image (AI) through the identifying icon (IC), can carry out an operation needed for the image.

A combined image (AI) can be displayed in various forms. For example, it can be displayed in a rectangular shape like a first combined image AI1. Or it may be displayed with its upper and lower part untrimmed as the second combined image AI2 shows. In this instance, the user can recognize more intuitively that the corresponding image is an image obtained from continuous shooting. A combined image (AI) can be displayed either in the form of the first combined image AI1 or in the form of the second combined image AI2 according to the user's selection and/or a control operation of the controller.

As shown in (a) of FIG. 11B, a combined image AI can be displayed with its upper and lower part untrimmed. In other words, a thumbnail that the user can intuitively perceive as an image from continuous shooting can be displayed on a preview screen. As shown in (b) of FIG. 11B, the user can apply a touch motion dragging his or her finger F along a predetermined direction. For example, the user can perform a dragging motion to the left on a particular combined image AI.

As shown in (a) of FIG. 11C, the controller 180 can change the form of a combined image AI in response to a dragging motion along a predetermined direction with respect to the corresponding thumbnail in the form of an untrimmed image. For example, a thumbnail with its upper and lower part untrimmed can be changed into an image of a rectangular form with the upper and the lower part trimmed. The form of the entire thumbnails can be changed all at once. Or only the thumbnails that the user touches and drags may change their form.

The user can carry out a dragging motion in the opposite direction of the initial setting with respect to the rectangular shaped thumbnails the upper and the lower part of which have been trimmed. For example, a dragging motion to the right can be performed. As shown in (b) of FIG. 11C, the controller 180, in response to a dragging motion along a particular direction, can change thumbnails of a rectangular shape again into the thumbnails with their upper and lower part untrimmed. Through this change, it is possible to increase the user's interest in the mobile terminal 100.

As shown in FIG. 12, the controller 180 can display a thumbnail of a combined image AI incorporating an identifier SL. Through the identifier SL, the user can easily recognize that the corresponding thumbnail is a combination of a plurality of image clusters.

Figure 13:
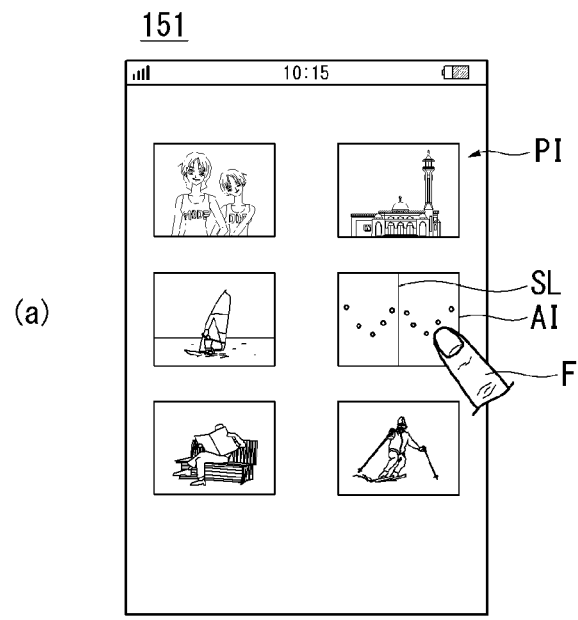
FIGS. 13 to 15 illustrate a method for playing a combined image generated in the mobile terminal of FIG. 1.
Figure 13:
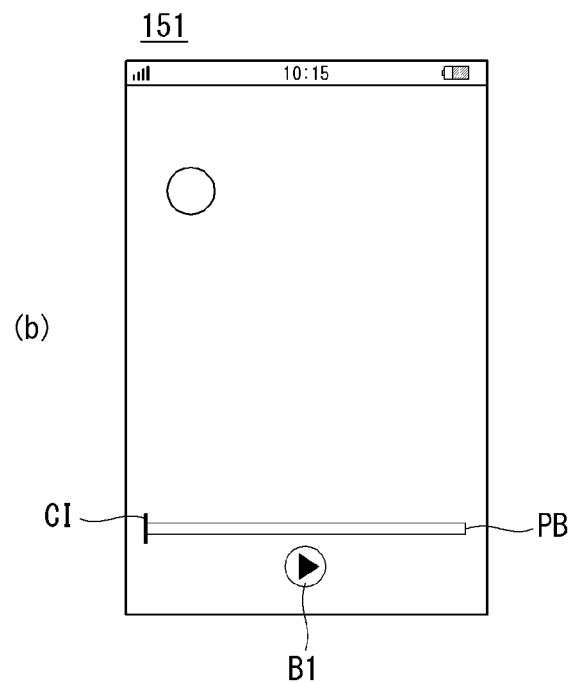
Figure 14:
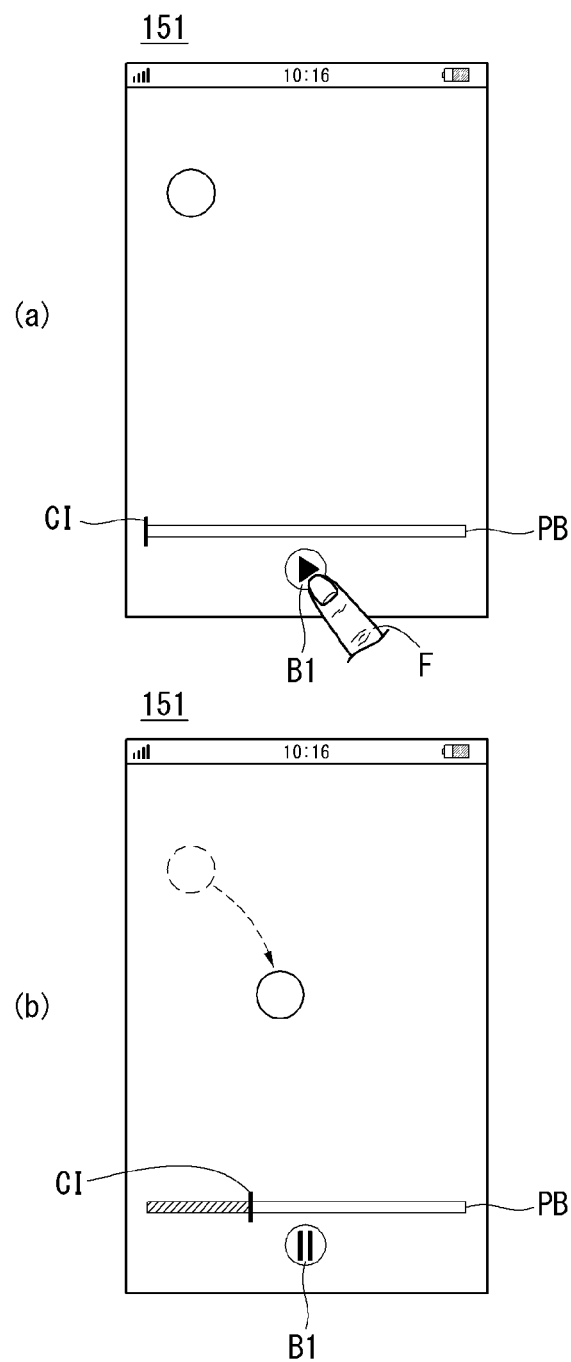
Figure 15:
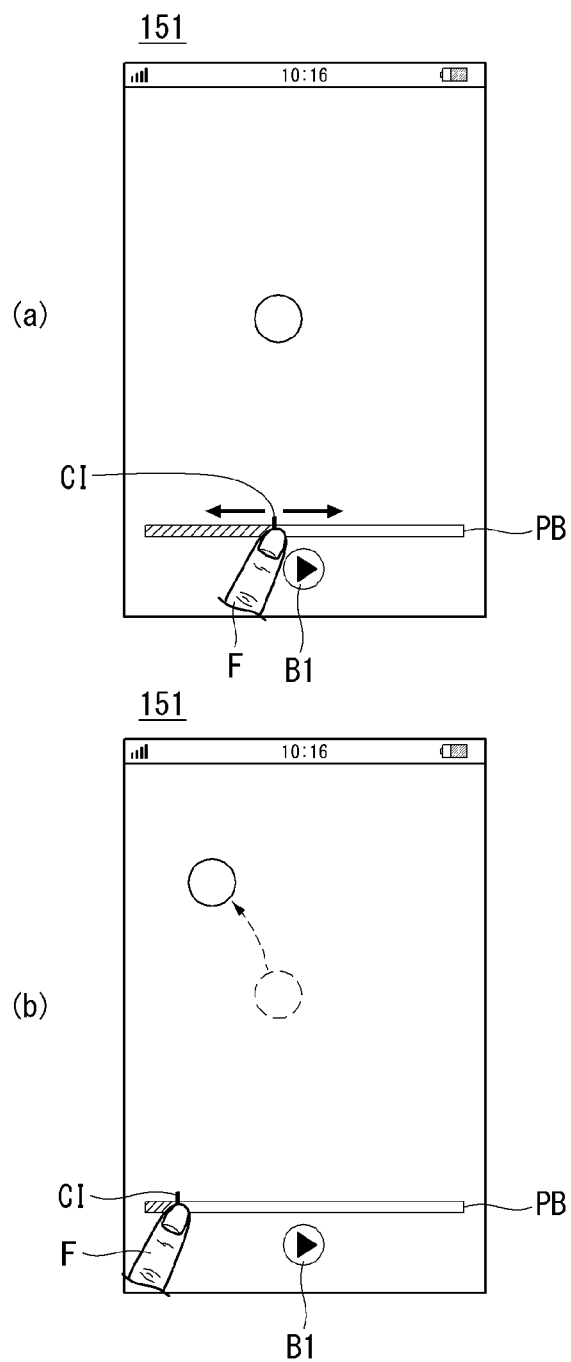
Figure 16:
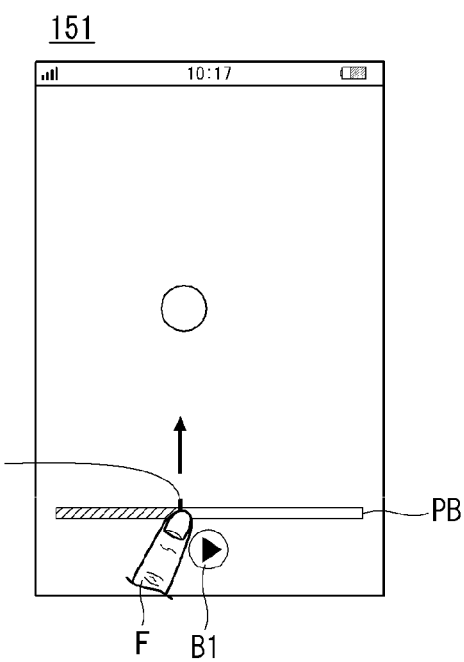
FIGS. 16 to 26 illustrate manipulation of a combined image generated in the mobile terminal of FIG. 1.
Figure 16:
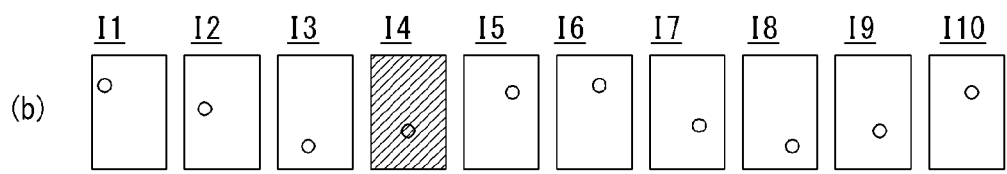
Figure 17:
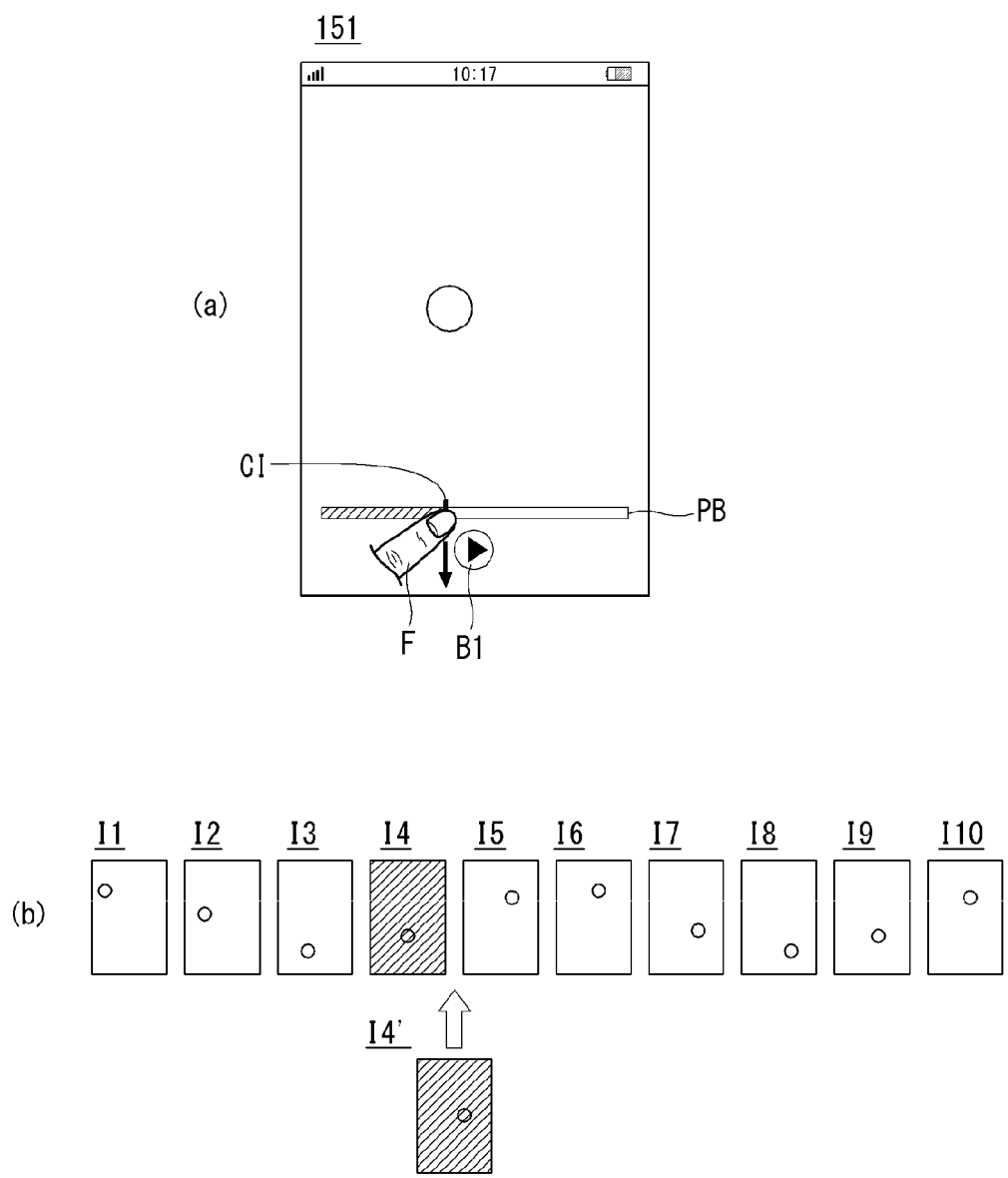
Figure 18:
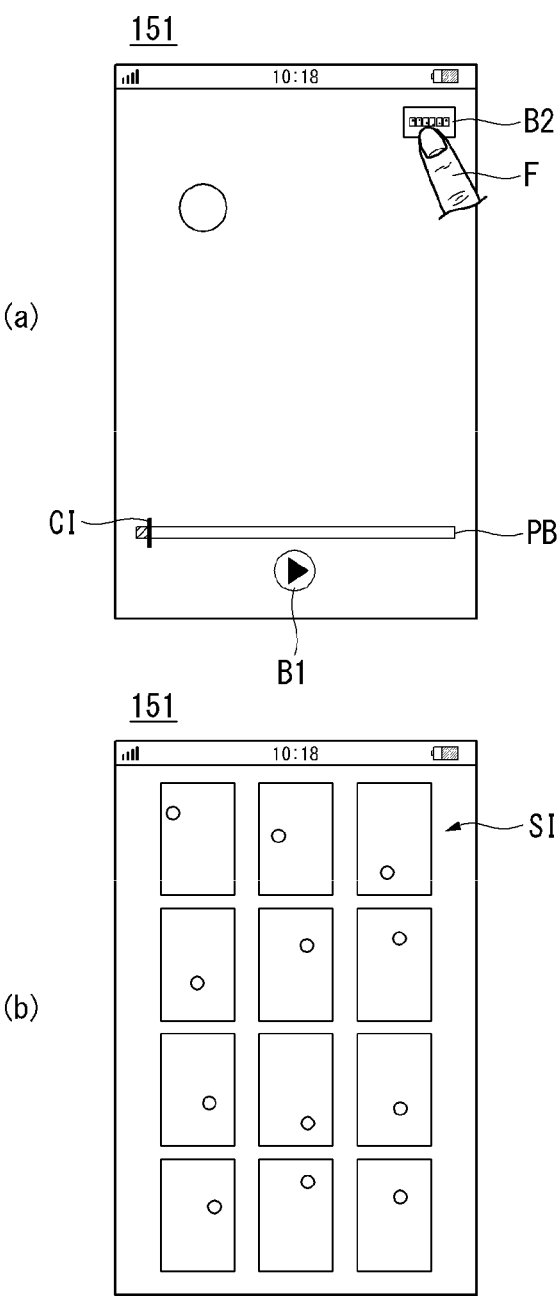
Figure 19:
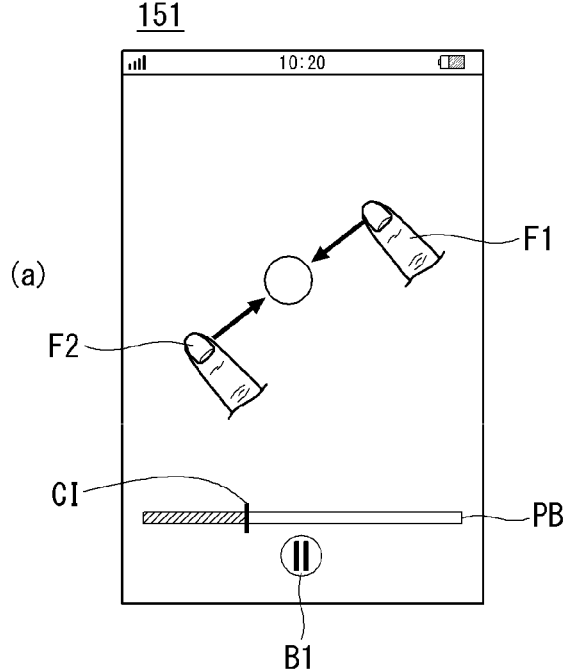
Figure 19:
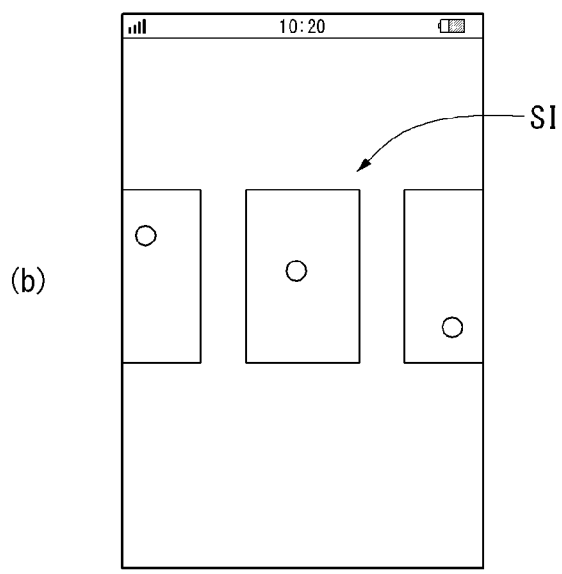
Figure 20:
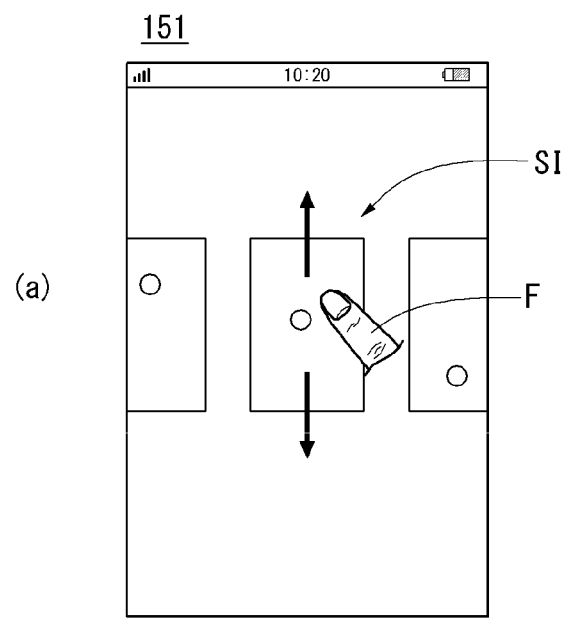
Figure 20:
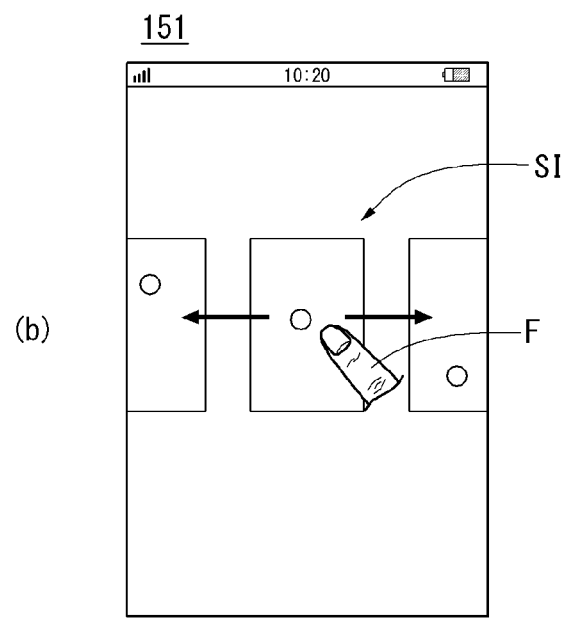

FIGS. 13 to 15 illustrate a method for playing a combined image generated in the mobile terminal of FIG. 1. As shown in the figures, the controller 180 according to one embodiment of the present invention can play a selected combined image AI. A combined image AI is different from a conventional video. In other words, a combined image is not a continuous image. However, the controller 180 can combine a plurality of images photographed at predetermined intervals to produce a combined image AI which is an animation image exhibiting a motion. In other words, it implies that a discontinuous motion of an object can be observed.

By employing a combined image AI, a plurality of images obtained through continuous shooting can be managed with ease. For example, in case ten images are obtained, instead of managing individual images, it suffices to manage a single combined image AI file only. For example, through manipulation of a combined image AI, at least one from among a plurality of images can be edited, more details of which will be described in the corresponding part of this document.

As shown in FIG. 13(a), the user can select a combined image AI by using his or her finger F. The controller 180 can play the selected combined image AI. The user may select a first IC1 or a second image cluster IC2 region that can be identified through an identifier SL of the combined image AI. For example, the user can select the first image cluster IC1 region. In case only the first image cluster IC1 region is selected, the controller 180 can play only the image corresponding to the first image cluster IC1 from among the combined image AI.

As shown in FIG. 13(b), the controller 180 can provide a screen for playing a selected combined image AI. For example, a progress bar (PB) corresponding to the whole combined image AI, an index CI for informing about a current play position, and a first button B1 with which the user can select whether to play/stop can be displayed.

As shown in FIG. 14(a), the user can select a first button B1 by using his or her finger F. The first button B1 can be toggled between play and stop. For example, the button operates as a play button at the beginning and operates as a stop button when an image is played. As shown in FIG. 14(b), the controller 180 can play a combined image AI. Playing of a combined image AI is different from the play of a conventional video as described earlier. In other words, playing of a combined image AI1 refers to playing images photographed at predetermined intervals in a discontinuous manner.

The controller 180 can change the position of an index CI while the combined image AI is being played. The user can intuitively recognize a current play position within the whole combined image AI through the position of the index CI.

As shown in FIG. 15(a), the user can change the play position in an arbitrary fashion. For example, the user can touch the index CI by using his or her finger F. The user can drag the touched index to the left or right. As shown in FIG. 15(b), the controller 180, in response to dragging the index, can change display of the display unit 151.

FIGS. 16 to 24 illustrate manipulation of a combined image generated in the mobile terminal of FIG. 1. As shown in the figures, the controller 180 according to one embodiment of the present invention can perform editing at least part of a combined image AI based on an input obtained from the user and a control signal of the controller 180.

As shown in FIG. 16(a), a particular image of the combined image AI can be displayed on the display unit 151. The user can carry out manipulation related to the particular image displayed. To manipulate the image, the user can carry out an operation of touching a particular position of the display unit 151. For example, the user can perform a touch motion of touching the index CI and dragging the index along an upward direction.

As shown in FIG. 16(b), the combined image AI can be an image combining first to tenth images (I1 to I10). And suppose the display unit 151 is currently displaying a fourth image I4. Under this condition, if a touch operation of dragging the index along an upward direction is performed, the controller 180 can remove the currently display fourth image I4. While the combined image AI is being displayed, a particular image can be removed through a touch operation at a particular position without incorporating manipulation of individual images constituting the combined image AI; thus, images from continuous shooting can be managed more effectively.

As shown in FIG. 17(a), the user can carry out a touch operation of touching an index CI and dragging the index along a downward direction. As shown in FIG. 17(b), in response to the touch operation of touching the index CI and dragging the index along a downward direction, the controller 180 can carry out an operation of adding a particular image. For example, if a fourth image I4 is currently displayed, the controller 180 can add additional fourth image I4' between the fourth image I4 and the fifth image I5. The additional fourth image I4' can be synthesized based on the fourth image I4 and the fifth image I5. For example, the additional fourth image I4' can be generated based on motion vector values of an object included in the image.

As shown in FIG. 18(a), a combined image AI can be unfolded according to the user's manipulation and/or a control operation of the controller 180. For example, the controller 180 can sense the user's selection of a second button B2 displayed on the display unit 151. As shown in FIG. 18(b), sensing the selection of the second button B2, the controller 180 display the images constituting a currently displayed combined image AI. For example, thumbnails of structural images SI constituting the combined image AI can be displayed. As thumbnails of the structural images SI are displayed, the user can watch individual images more closely.

As shown in FIG. 19(a), the user can carry out a touch operation with respect to the display unit 151 displaying a combined image AI. For example, the user can perform a touch motion along a direction decreasing the distance between a first F1 and a second finger F2. As shown in FIG. 19(b), in response to a particular touch motion of the user, the controller 180 can display the structural images SI on the display unit 151. The central image among the structural images SI displayed on the display unit 151 can correspond to an image currently played. Structural images SI can be displayed being larger than conventional thumbnail images. In what follows, structural images SI of this kind will be called panel images.

As shown in FIGS. 20(a) and (b), the user can manipulate structural images SI displayed in the form of panel images. For example, the user can perform a touch operation of dragging a panel image along an upper or lower direction, or left or right direction by using his or her finger F. The controller 180 can carry out a particular operation in response to a dragging touch operation on the panel image. For example, if the user performs a touch operation of dragging the panel image along an upper direction, the controller 180 can delete the corresponding panel image. If the corresponding panel image is deleted, the corresponding part of the combined image AI may not be played afterwards.

As shown in FIG. 21(a), the controller 180 can edit a particular image of a combined image AI. There are times when a particular image among the images constituting a combined image AI is blurred due to shaking at the time of photographing. The user can touch the display unit 151 when the particular image is displayed. For example, the user may make a long touch on the index CI or perform a touch operation of rubbing the display unit 151 while keeping a touch on the display unit 151.

Figure 21:
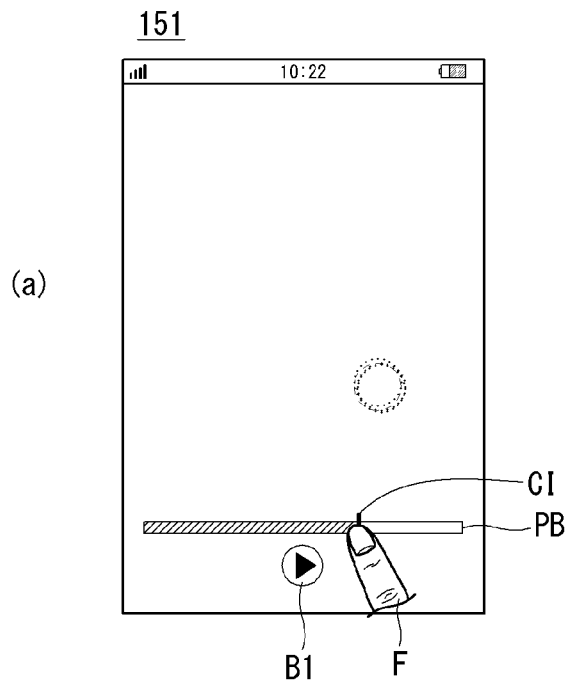
Figure 21:
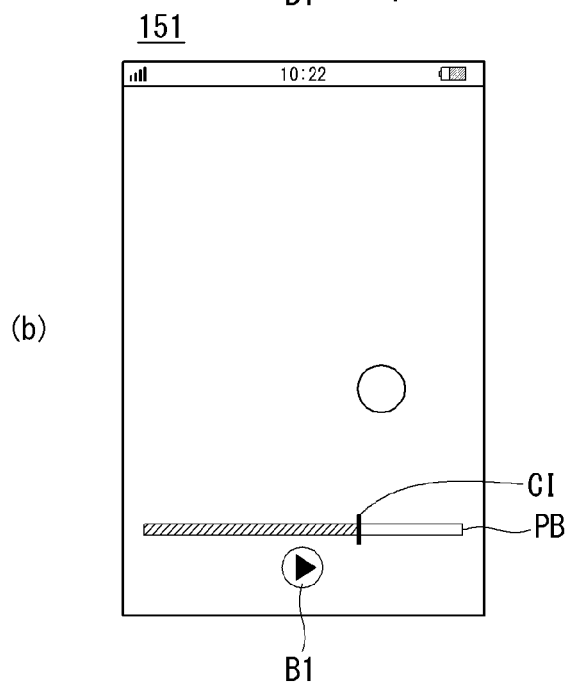

As shown in FIG. 21(*b*), if the aforementioned touch motion of the user is received, the controller 180 can carry out post-processing of the corresponding image. For example, the controller 180 can carry out an operation of compensating for the blurring part with reference to the previous and/or the next image of the corresponding image to produce a sharper image.

Figure 22:
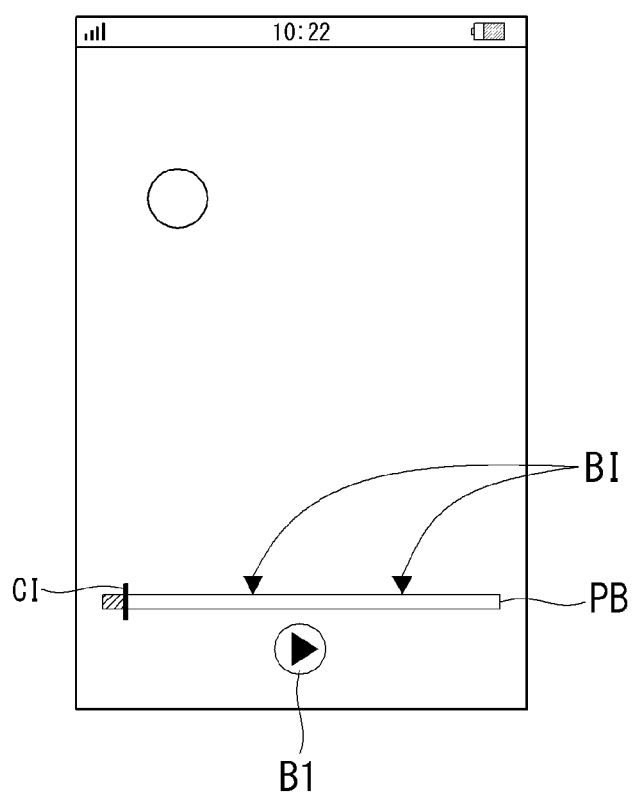

As shown in FIG. 22, the controller 180 can display the status of a combined image AI. For example, the controller 180 can display a status icon BI at a particular position on a progress bar (PB) corresponding to the combined image AI. A status icon BI can represent the status of a particular image among the images constituting, the combined image AI. For example, in case the quality of a particular image is inferior to that of other images, the status icon (BI) can represent the corresponding position. The status icon (B1) can represent the boundary between image clusters. For example, as shown in the figure, if two status icons BIs are displayed, the user can intuitively recognize that the corresponding combined image AI consists of three image clusters.

Figure 23:
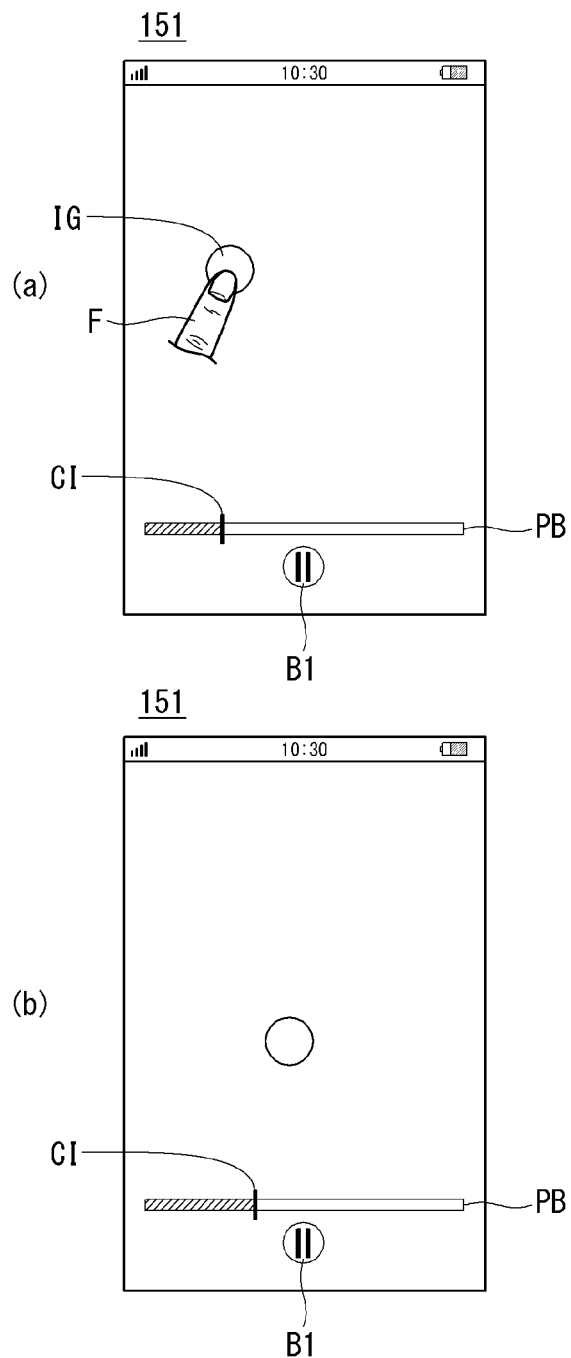

As shown in FIG. 23(*a*), the controller 180 can adjust the position of a particular object IG photographed based on the user's selection. For example, the user can select a particular object IG from among displayed objects by using his or her finger F. As shown in FIG. 23(*b*), the controller 180 can display a selected particular object 10 by changing the position of the particular object. For example, the user can make the particular object 10 displayed at the center of the display unit 151. In other words, it provides an impression that the particular object 10 is fixed at a particular center of the display unit 151 but the background is moved.

Figure 24:
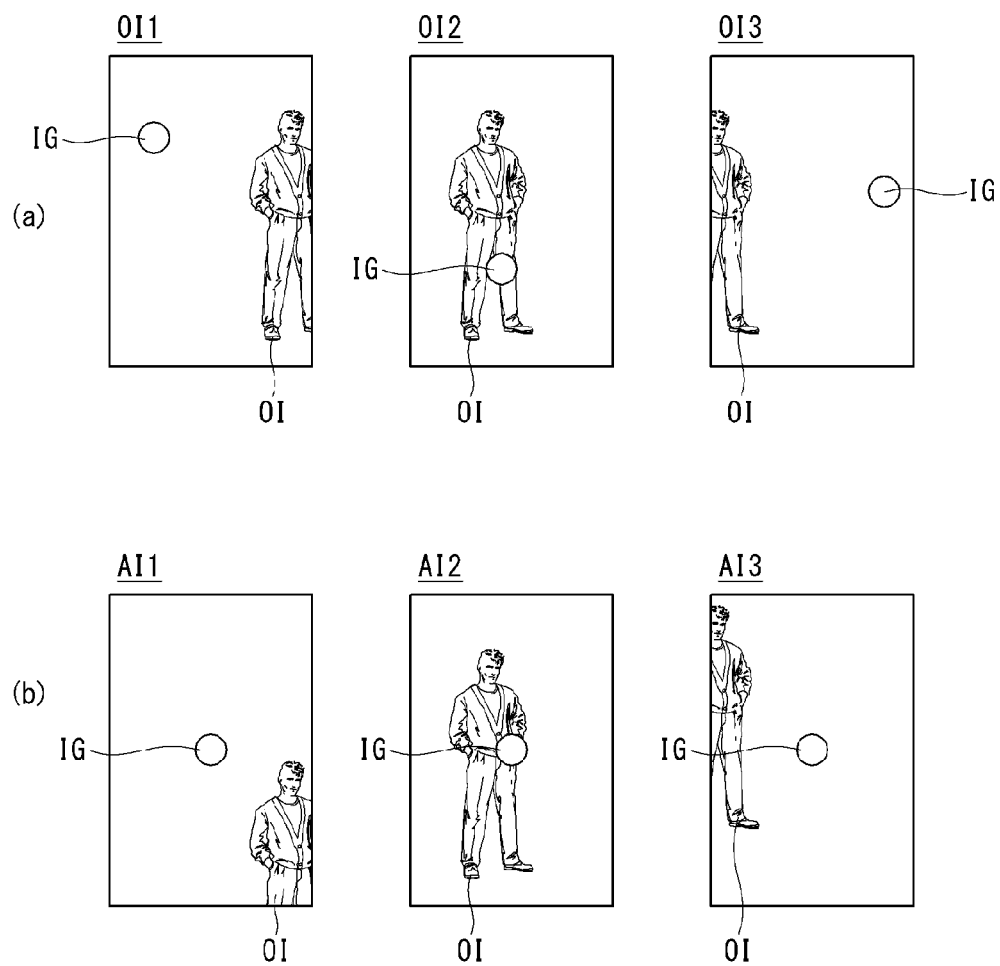

FIG. 24 illustrates a difference between the case where images are played by a conventional method and the case where the images are played while a particular object is fixed at a particular position. As shown in FIG. 24(*a*), according to an existing method for playing images, the position of a background object OI is changed according to the movement of a particular object IG. In other words, as the particular object IG moves, the user may recognize that the relative position of the background object OI is changed.

As shown in FIG. 24(*b*), in case an image is played after a particular object 10 is fixed at one position, the user can observe as if the position of the background object OI is moved while the particular object IG is fixed. In other words, the user recognizes as if the display screen is changed as the background object OI is moved. A mobile terminal 100 according to one embodiment of the present invention can make the user feel differently from a conventional image play by playing a combined image AI with respect to a selected, particular object IG.

Figure 25:
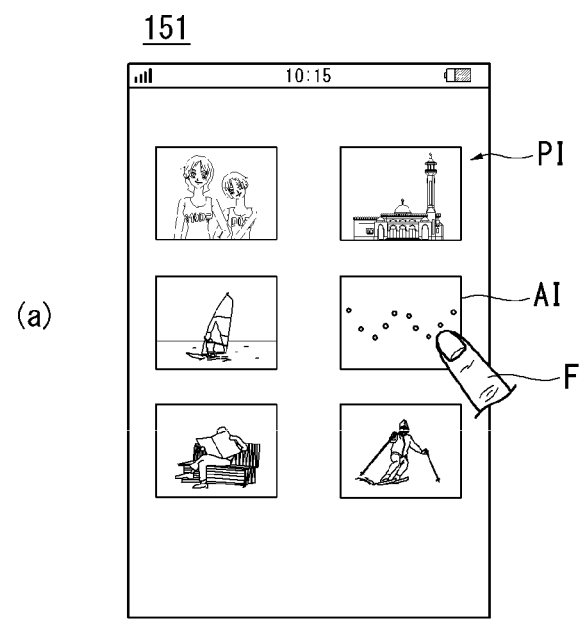
Figure 25:
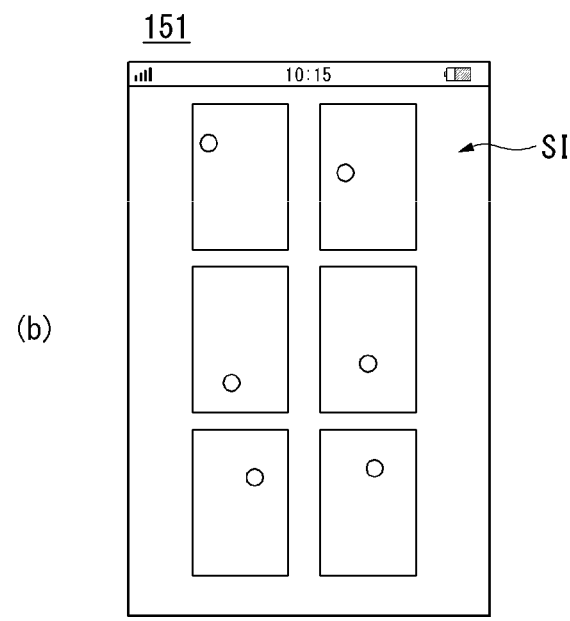
Figure 26:
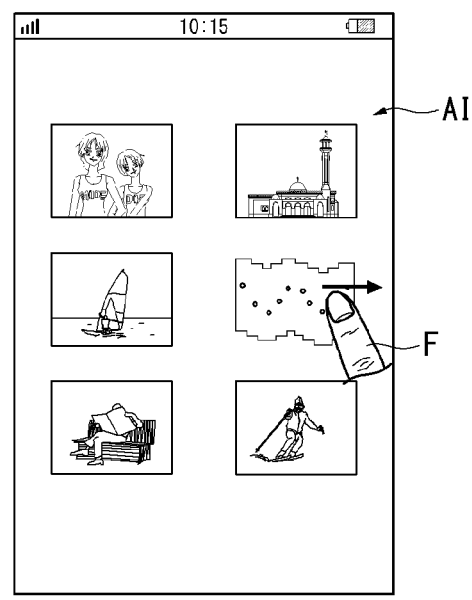
Figure 26:
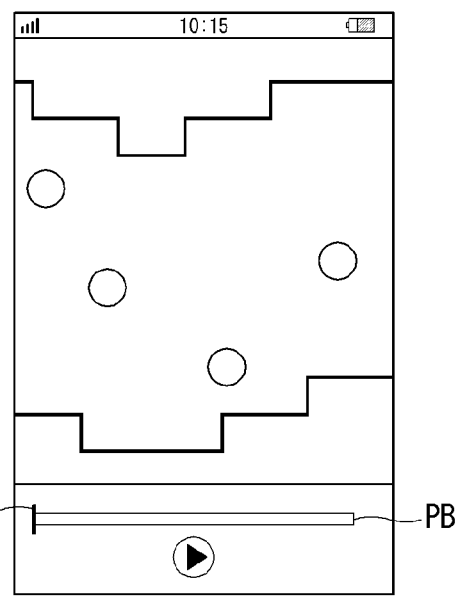

FIGS. 25 and 26 illustrate manipulation of thumbnails of a combined image generated in the mobile terminal of FIG. 1. As shown in the figures, the controller 180 according to one embodiment of the present invention can edit a combined image AI through direct manipulation of the thumbnail images displayed on a preview screen.

As shown in FIG. 25(*a*), the preview screen can display a plurality of thumbnail images PI. Among the thumbnail images PI, a thumbnail of a combined image AI may be included. The user can select the displayed thumbnail of the combined image AI by using his or her finger F. As shown in FIG. 25(*b*), if the thumbnail of the combined image AI is selected, the controller 180 can display each of the structural images SI constituting the corresponding combined image AI in the form of a thumbnail.

As shown in FIG. 26(*a*), the display unit 151 can display a preview screen. The preview screen may include a combined imago AI generated from continuous shooting. The user can carry out a particular touch operation on the combined image AI. For example, the user can perform a dragging motion on the combined image AI. As shown in FIG. 26(*b*), if a particular touch motion of the user is received, the controller 180 can display the corresponding thumbnail across the full screen. At this time, the controller 180 can display the image on the display unit while the upper and the lower part of the image are untrimmed. Therefore, the user can recognize more clearly that the corresponding image has been generated from continuous shooting.

Figure 27:
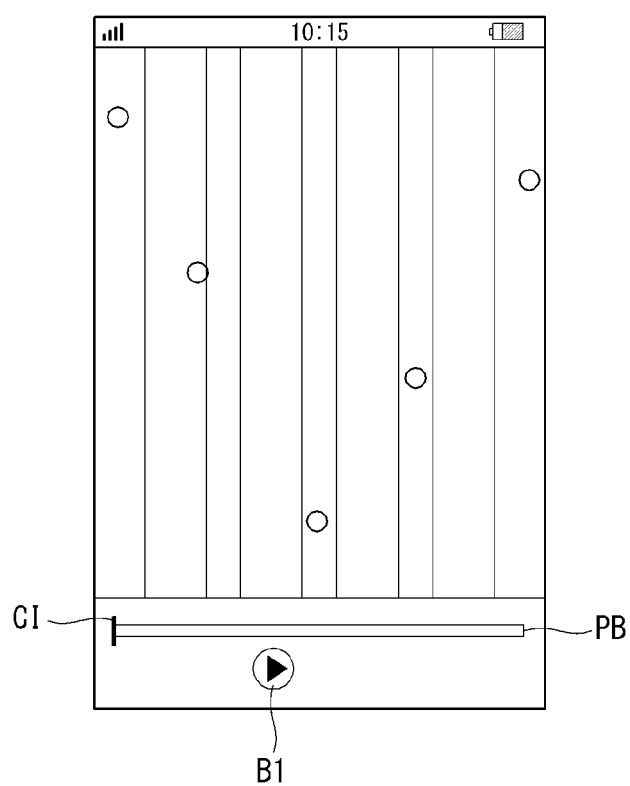
FIGS. 27 and 28 illustrate manipulation of thumbnails of a combined image created in the mobile terminal of FIG. 1.

As shown in FIG. 27, if a particular touch motion of the user is received, the controller 180 can display the corresponding thumbnail image across the full screen. At this time, the controller 180 can display the boundaries of the original images with their upper and lower parts trimmed.

Figure 28:
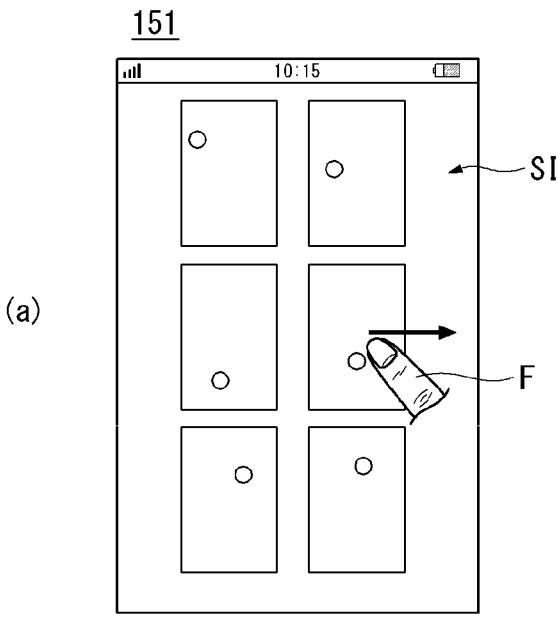
Figure 28:
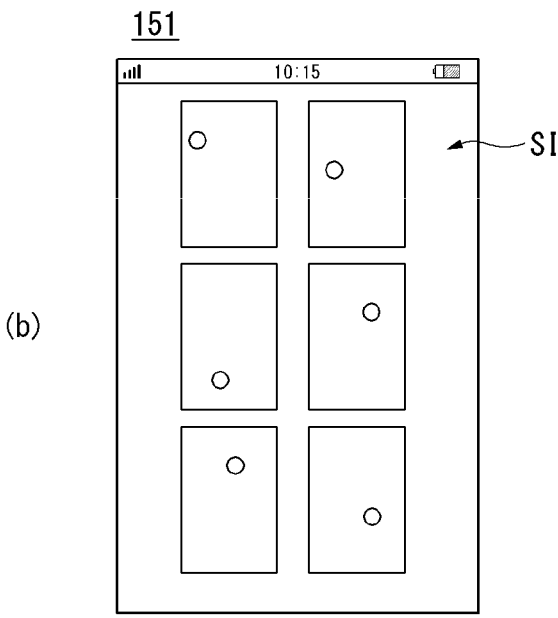

As shown in FIG. 28(*a*), the user can manipulate a particular image among structural images SI displayed. For example, the user can perform a touch motion of touching a particular image among the displayed structural images SI and dragging the particular image along a predetermined direction. The controller 180 can carry out an operation in accordance to the dragging direction. For example, if the user touches a particular image and drags the particular image toward the outside of the display unit 151, an operation of deleting the corresponding image can be performed.

As shown in FIG. 28(*b*), the controller 180 can delete the corresponding image in response to a touch motion of the user. The deleted image can be replaced with another image constituting the combined image AI. For example, the next image of the deleted image can be displayed.

Figure 29:
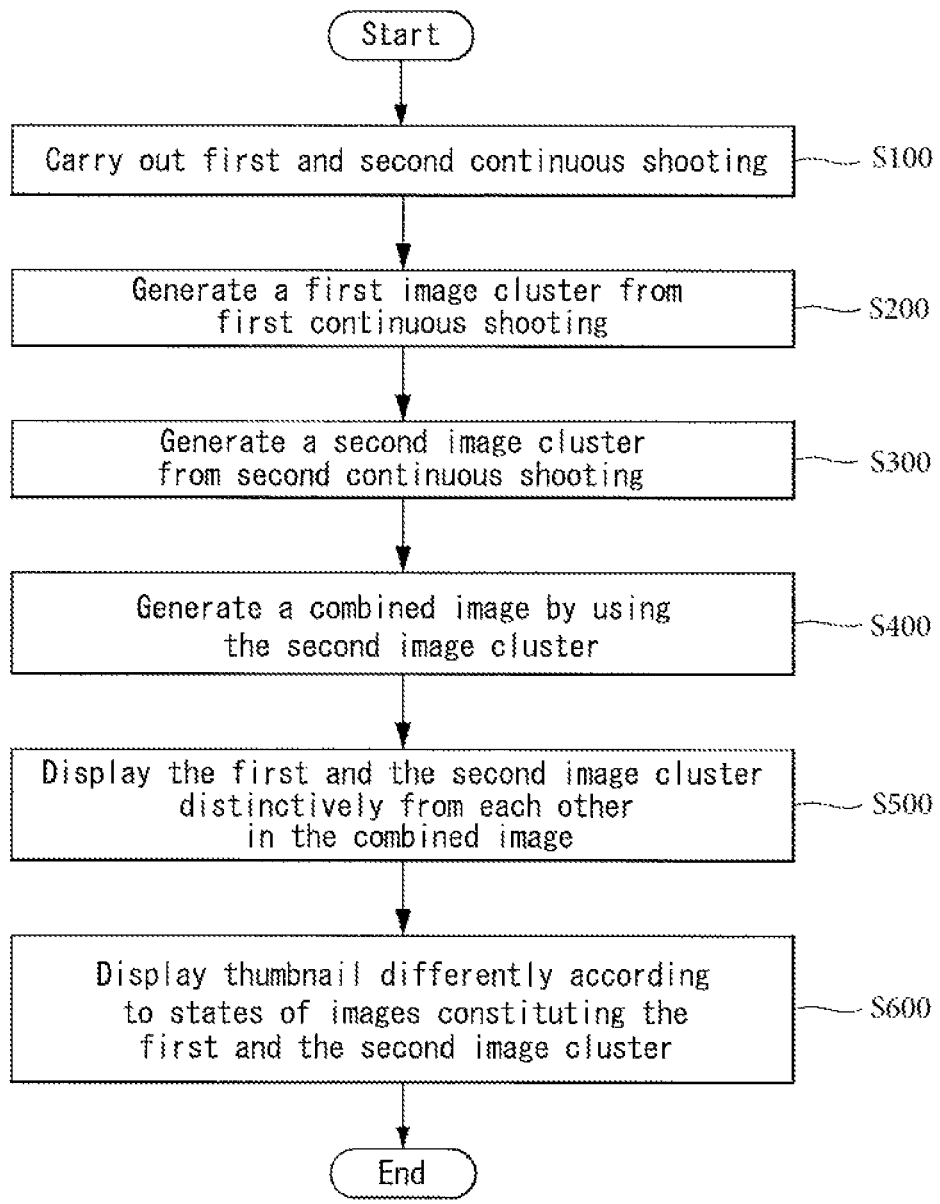
FIG. 29 is a flow diagram illustrating operation of the mobile terminal of FIG. 1.

FIG. 29 is a flow diagram illustrating operation of the mobile terminal of FIG. 1. As shown in the figure, the controller 180 according to one embodiment of the present invention performs first and second continuous shooting (S100).

The first and the second continuous shooting can be performed by the camera 121. The camera 121 can be disposed on at least one surface of the mobile terminal 100. For example, the camera 121 can include a front camera (121*a* of FIG. 3) disposed on the front surface of the mobile terminal 100 and a rear camera (121*b* of FIG. 3) disposed on the rear surface thereof. For most cases, the rear camera (121*b* of FIG. 3) can be used for shooting an external scene. However, unless intended for a particular purpose, the front camera (121*a* of FIG. 3) and the rear camera (121*b* of FIG. 3) are commonly referred to as the camera 121.

The first and the second continuous shooting can indicate the operation of taking a plurality of photographs within a predetermined time period. For example, continuous shooting can refer to the operation of capturing 20 still images within one second. The time period for continuous shooting and/or the number of times for continuous shooting can be changed. A plurality of continuous shooting can be performed at regular intervals. For example, first continuous shooting may be performed for a predetermined time period, and after a predetermined interval, second continuous shooting may be performed again for a predetermined time period.

The first and the second continuous shooting can be performed by the user's operation and/or a control signal of the controller 180. For example, the first continuous shooting may be performed while a touch input on a shooting button continues to last, and the second continuous shooting may be performed while a touch input again continues to last on the shooting button.

The controller 180 generates a first image cluster due to the first continuous shooting (S200) and a second image cluster due to the second continuous shooting (S300). An image cluster denotes a set of images created from a single trial of continuous shooting. A predetermined number of images can be generated from a single trial of continuous shooting. For example, five successive images with a time difference one after another can be generated. The five images may differ slightly from each other due to a small amount of time difference, but since the time difference is not large, a great portion of the images can overlap with each other.

The controller 180 can manage the images generated from a single trial of continuous shooting as one set. The controller 180 can manage the images generated from a single trial of continuous shooting as one image cluster. For example, images obtained from a single trial of continuous shooting can be used to produce a single image by combining overlapping portions between the images. In what follows, a single image formed by the aforementioned process is called an image cluster. Therefore, if continuous shooting is performed two times, two image clusters are generated.

The controller 180 generates a combined image by using first and second image clusters (S400). As described above, the first and the second image cluster correspond to a set of images captured by first and second continuous shooting, respectively. The controller 180 can combined the first and the second image cluster together. For example, the controller 180 can create a combined image by combining an overlapping portion between the first and the second image cluster. Though described in detail in the corresponding part of this document, a combined image can provide an animation effect as if a photographed subject actually moves while in fact, the combined image is not a video.

The controller 180 then indicates distinctively the first and the second image cluster in the combined image (S500). A combined image can be formed by a set of images generated from a plurality of continuous shooting. For example, a combined image can be a set of images from the first and the second continuous shooting. The controller 180 can indicate distinctively the first and the second image cluster in the combined image. Therefore, the user, watching the combined image displayed, can intuitively distinguish the part due to the first continuous shooting from the part due to the second continuous shooting.

The controller 180 can display thumbnails differently according to the states of images constituting the first and the second image clusters performed (S600). The display unit 151 may display an image gallery. In other words, the display unit 151 may be operating in an image gallery mode where images stored in the mobile terminal 100 are displayed. The image gallery mode is different from the mode where one particular image is displayed occupying a large area. In the image gallery mode, the images stored in the mobile terminal 100 are displayed in the form of thumbnails so that the user can easily recognize the images.

The controller 180 can display the thumbnail of a combined image in the image gallery mode differently according to the states of the images constituting the first and the second image cluster. The states of the images constituting the first and the second image cluster can indicate the number of images constituting at least one image cluster between the first and the second image cluster.

The first and the second image cluster may consist of dozens of images, respectively. The controller 180 can change at least one of widths and sizes of thumbnails according to the number of images constituting the corresponding image cluster. For example, in case an image cluster consists of a large number of images, thumbnails of the corresponding combined image can be displayed to have a large width. The states of the images constituting the first and the second image cluster can indicate degree of motion of an object included in the images constituting at least one image cluster between the first and the second image cluster.

An object included in the images constituting the first and the second image cluster can exhibit various types of motion. For example, some object may show large motion as when a football player is being photographed. Further, some object may show small motion as when a person sitting still is being photographed. In the case of an object showing small motion, a good amount of common parts can be found between the n-th image and the (n+1)-th image. In this instance, the controller 180 can display thumbnails of the corresponding combined image to have a small width. Therefore, even if image clusters have the same number of images to each other, thumbnails of the respective combined images can be displayed differently according to the state of an object at the time of being photographed.

Figure 30:
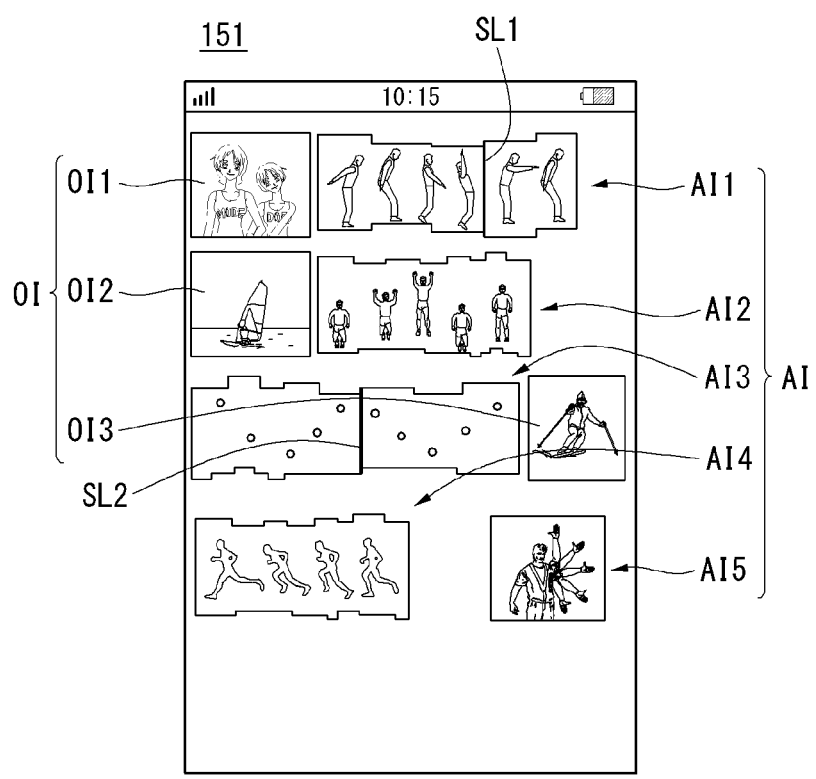
FIG. 30 illustrates an image gallery mode according to one embodiment of the present invention.

FIG. 30 illustrates an image gallery mode according to one embodiment of the present invention. As shown in the figure, the controller 180 according to one embodiment of the present invention can display a combined image AI and ordinary images OI together in an image gallery mode.

As described above, the image gallery mode can refer to a display mode where images stored in the mobile terminal 100 can be viewed in the form of thumbnails. In the image gallery mode, the controller 180 can display combined images AI and ordinary images OI together. In other words, a combined image AI can also be displayed in the form of a thumbnail similarly to ordinary images OI.

In the image gallery mode, combined images AI can be distinguished from ordinary images OI. For example, an ordinary image OI can be displayed in a rectangular form, while a combined image AI is displayed so that images constituting the combined image can be displayed being overlapped with each other. Since a combined image is displayed in the form of a thumbnail horizontally long and with overlapping images and/or a thumbnail with overlapping images, the user can intuitively recognize that the corresponding thumbnail is a combined image AI.

Depending on the states of source images constituting a combined image AI, at least one of width and size of the corresponding thumbnail of the combined image AI can be changed. For example, the width of a combined image AI becomes large as the number of the original images is increased. The more the original images overlap with each other, width of the corresponding combined image AI becomes smaller.

The controller 180 can construct a combined image AI to have a size similar to ordinary images OI. For example, in case there is a large overlap among the original images constituting the combined image AI as can be found from a fifth combined image AI5, a combined image AI in the form similar to ordinary images OI can be generated. The fifth combined image AI5 will be described in detail at the corresponding part of this document.

Some combined image AI may consist of a plurality of image clusters. In case a plurality of image clusters are used to form a combined image AI, identifiers SL1, SL2 can be displayed as illustrated for a first and a third combined image AI1, AI3.

Figure 31:
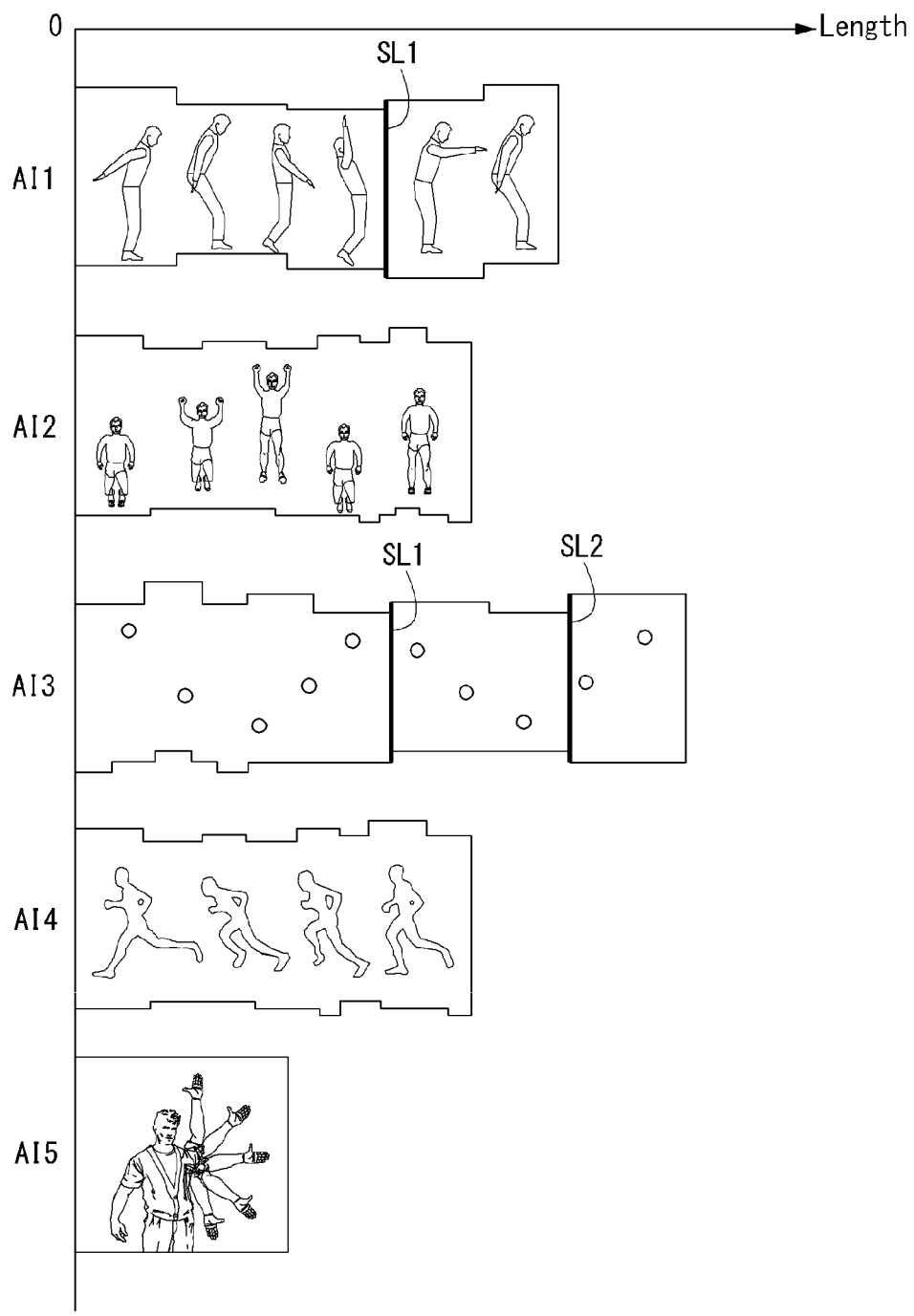
FIGS. 31 and 32 illustrate a combined image according to one embodiment of the present invention.
Figure 32:
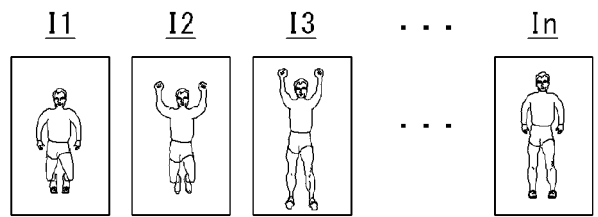
Figure 32:
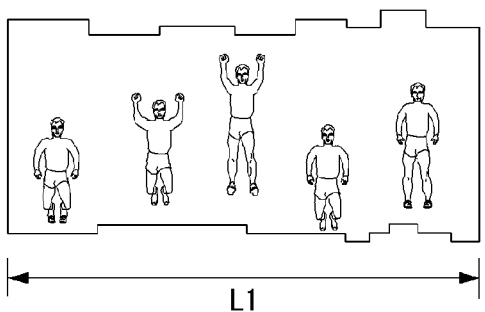
Figure 32:
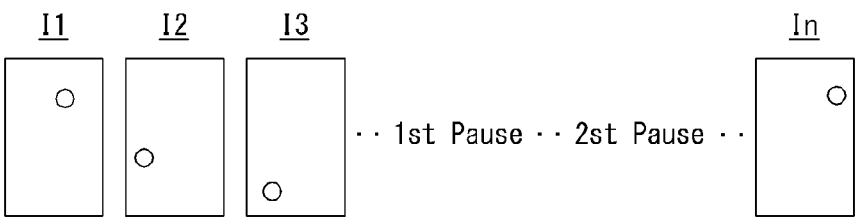
Figure 32:
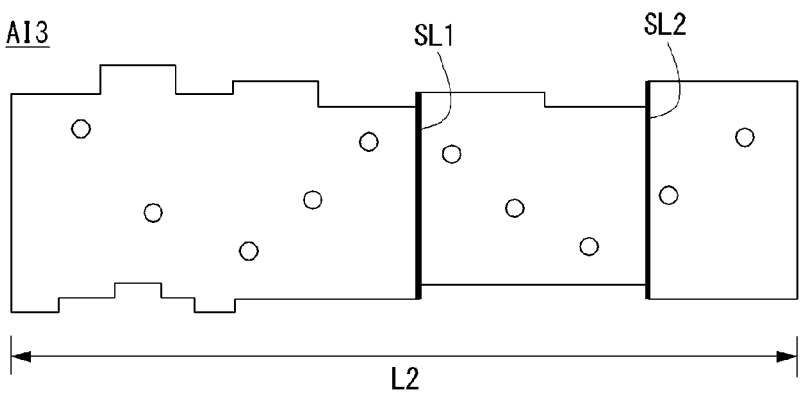

FIGS. 31 and 32 illustrate a combined image according to one embodiment of the present invention. As shown in the figures, the controller 180 according to one embodiment of the present invention can display a combined image AI differently according to the number of images included and/or the degree of motion of an object photographed.

As shown in FIG. 31, sizes of combined images AI can be varied. For example, at least one of length and/or size can be different among first to fifth combined images (AI1 to AI5). A combined image AI may include identifiers SL1, SL2 as a plurality of image clusters are combined together. Also, as in the case of the fifth combined image AI5, when an object being photographed shows little motion, the corresponding combined image may be displayed to have a size similar to that of an ordinary image. However, it should be noted that motion of a photographed object can be displayed on the same image for the case of the fifth combined image AI5 displayed to have a size similar to an ordinary image. For example, a trajectory along which the arm of a photographed object moves can be displayed.

As shown in FIG. 32, even when the same number of images are employed to construct combined images AI, length and/or size of individual combined images AI can be varied depending on the situation. As shown in FIG. 32(a), a first combined image AI1 can be generated based on first to n-th images (I1 to In). The length of the first combined image AI1 can be L1.

As shown in FIG. 32(b), a second combined image AI2 can be generated based on first to n-th images (I1 to In) consisting of the same number of images as the first combined image AI1. However, first and second pauses may be included among the first to the n-th image (I1 to In). In other words, this implies that an operation of pausing and resuming photographing has been performed twice during image shooting.

The length of the second combined image AI2 which combines the first to the n-th images (I1 to In) including the first and the second pause can be L2. In other words, the length of the second combined image AI2 can be different from that of the first combined image AI1 which combines the same number of images. The difference can be understood easily if one takes into account the fact that combined images AI are generated based on photographing conditions.

In other words, length and/or size of a combined image AI can be determined based on at least one factor among the number of images, whether a pause is inserted during image shooting and/or degree of motion of an object included in the images. That the first and the second pause are included during the image shooting of the first to the n-th image (I1 to In) can be known from the fact that the first and the second identifier (SL1, SL2) are included in the second combined image AI2.

Figure 33:
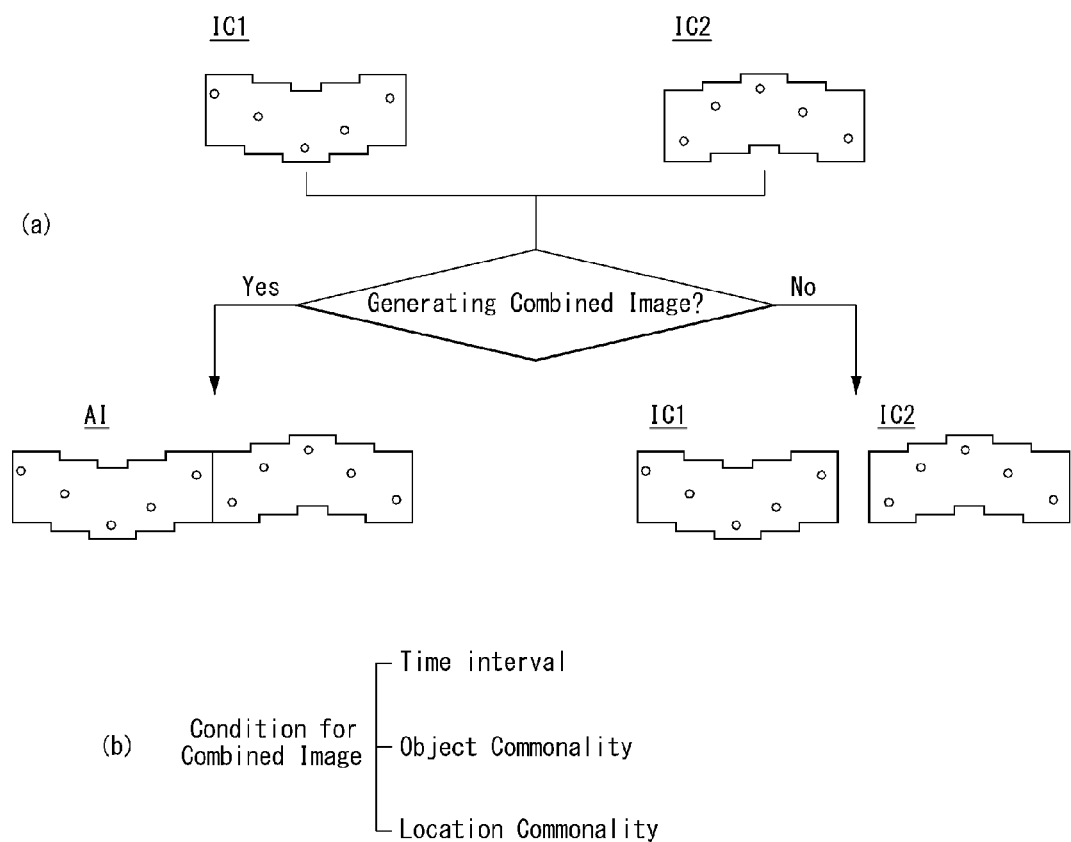
FIG. 33 illustrates a method for generating a combined image according to one embodiment of the present invention.

FIG. 33 illustrates a method for generating a combined image according to one embodiment of the present invention. As shown in the figure, a combined image AI according to one embodiment of the present invention can be generated according to a predetermined criterion.

As shown in FIG. 33(a), suppose there are a first image cluster IC1 and a second image cluster IC2. The first IC1 and the second image cluster IC2 may be a collection of images captured discontinuously. For example, it can be the case that the collection of images are obtained from a series of operations comprising image shooting of the first image cluster IC1, a pause, and image shooting of the image cluster IC2. The controller 180 can determine whether to generate a combined image AI by combining the first and the second image cluster IC1, or whether to maintain the first and the second image cluster IC1, IC2 apart.

As shown in FIG. 33(b), whether to combine image clusters can be determined based on a predetermined criterion. For example, the controller 180 can take into account the shooting intervals of the first and the second image cluster IC1, IC2. For example, whether image shooting of the second image cluster IC2 has been performed within a predetermined time period after completion of image shooting of the first image cluster can be taken into account.

The controller 180 can take into account degree of commonality of a photographed object. For example, if it is the case that the same person is captured in the first and the second image cluster IC1, IC2, the controller 180 can generate a combined image AI by combining the first and the second image cluster IC1, IC2 with a high probability.

The controller 180 can take into account location commonality. For example, if shooting positions and/or directions of the first and the second image cluster IC2 are the same to each other, the controller 180 can combine the first and the second image cluster IC1, IC2 with a high probability. The controller 180 can generate a combined image AI based on at least one or a combination of multiple conditions above.

Figure 34:
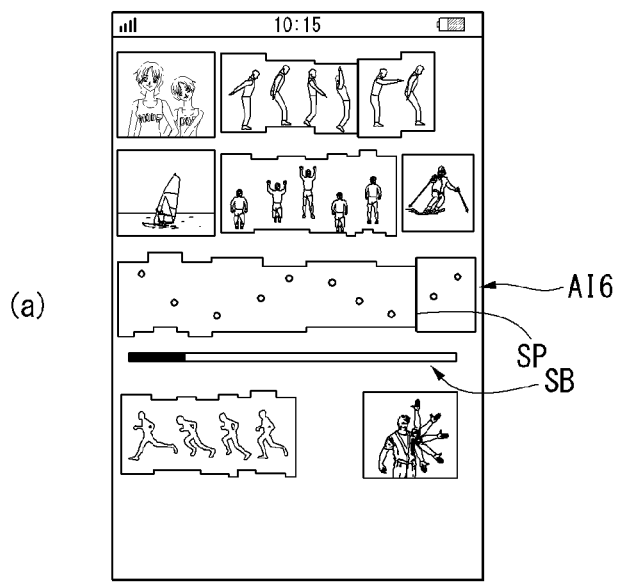
FIGS. 34 to 36 illustrate a method for displaying a combined image according to one embodiment of the present invention.
Figure 34:
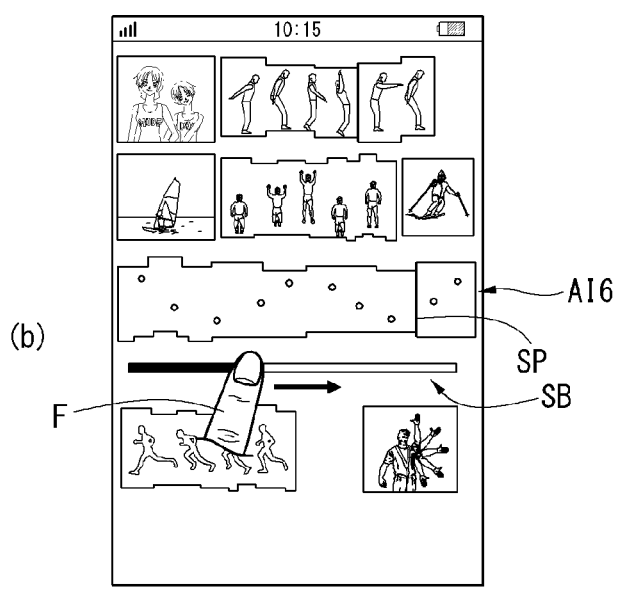
Figure 35:
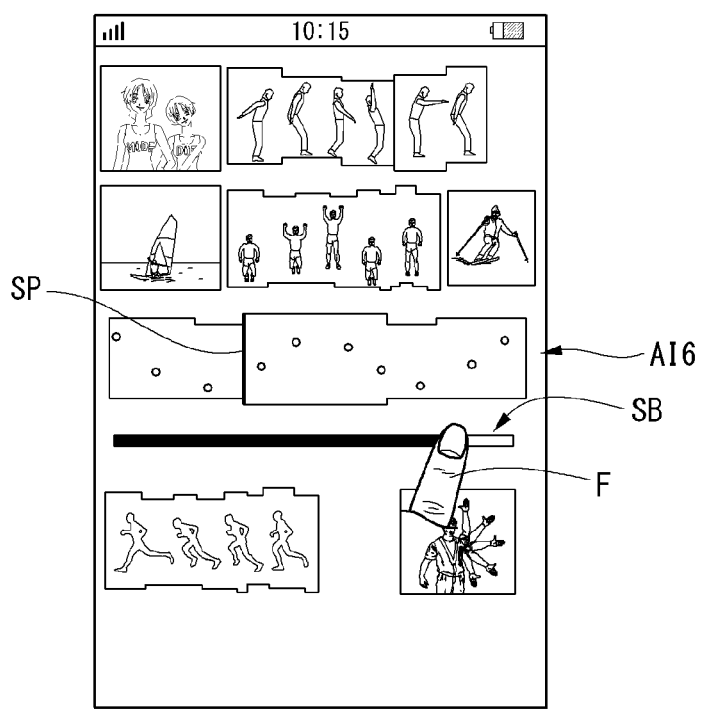
Figure 36:
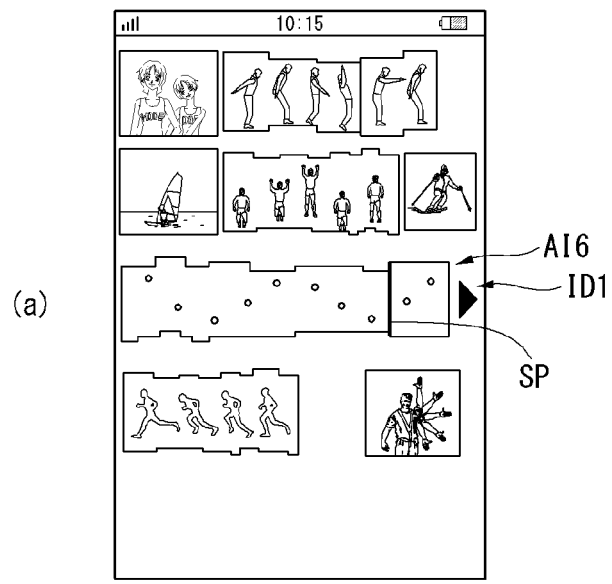
Figure 36:
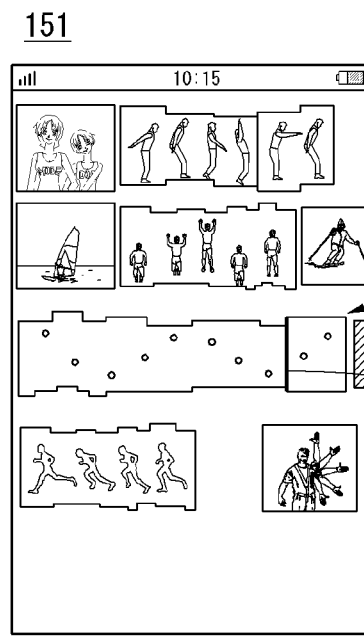

FIGS. 34 to 36 illustrate a method for displaying a combined image according to one embodiment of the present invention. As shown in the figures, the controller 180 according to one embodiment of the present invention can display the state of a combined image AI in various ways.

As shown in FIG. 34(a), a sixth combined image AI6 can be displayed in the image gallery mode. The sixth combined image AI6 may exceed the width of the display unit 151. In other words, the entire sixth combined image AI6 may not be displayed within one screen. In this instance, the controller 180 can reduce the size of the sixth combined image AI6 so that it can fit to the width of the display unit 151. Or the controller 180 can display only part of the sixth combined image AI6 on the display unit 151.

When only part of the sixth combined image AI6 is displayed, the controller 180 can add a scroll bar SB. The controller 180 can change the part of the sixth combined image AI6 to be displayed in accordance with the user's touch motion on the scroll bar SB. As shown in FIG. 34(b), the user can touch and drag the scroll bar SB by using his or her finger F.

As shown in FIG. 35, if the scroll bar SB is dragged, the controller 180 can display a different part of the sixth combined image AI6. The user, by dragging the scroll bar SB, can watch the part that the user wants to. As shown in FIG. 36(a), the controller 180 can display a first indicator ID1. For example, in order to notify the user of the fact that only part of the long, sixth combined image AI6 is displayed, the controller 180 can display the first indicator ID1 in the form of an arrow. As shown in FIG. 36(b), the controller 180 can display a second indicator ID2. For example, a second indicator ID2 indicating the dimmed, extending part of the sixth combined image AI6.

Figure 37:
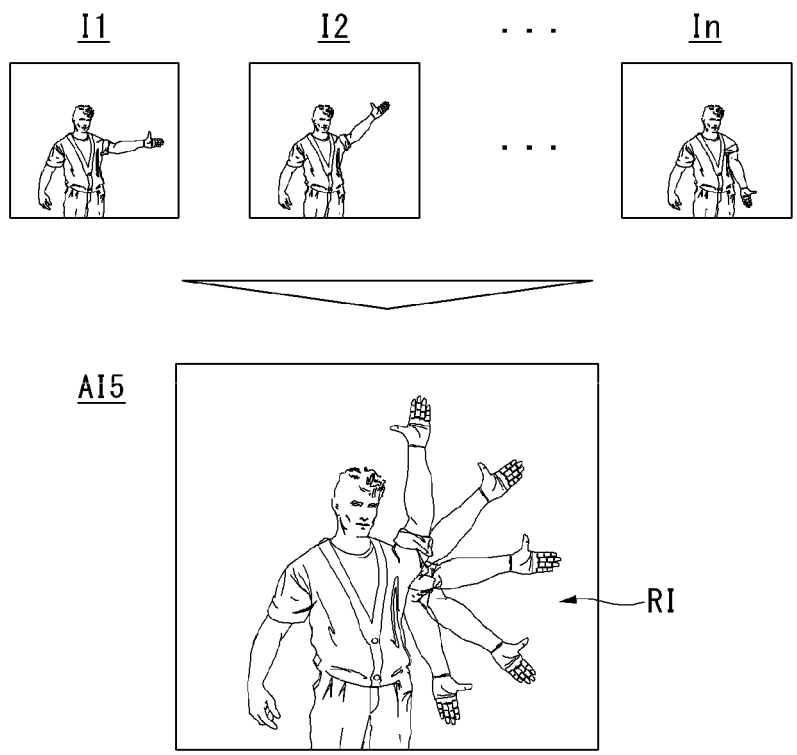
FIGS. 37 to 39 illustrate a method for playing a combined image according to one embodiment of the present invention.
Figure 38:
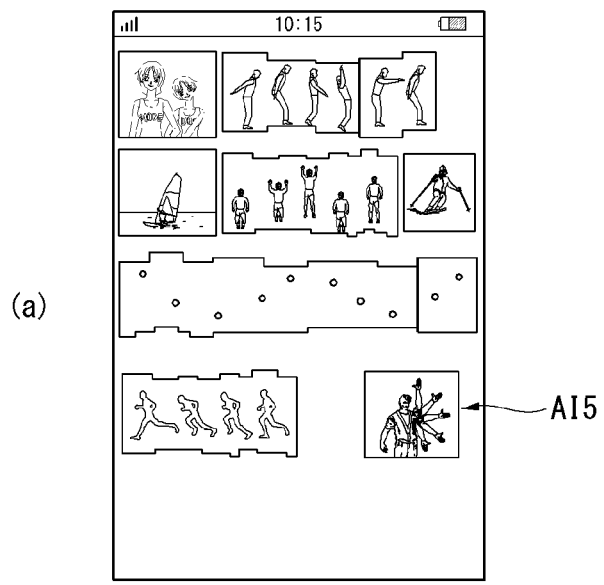
Figure 38:
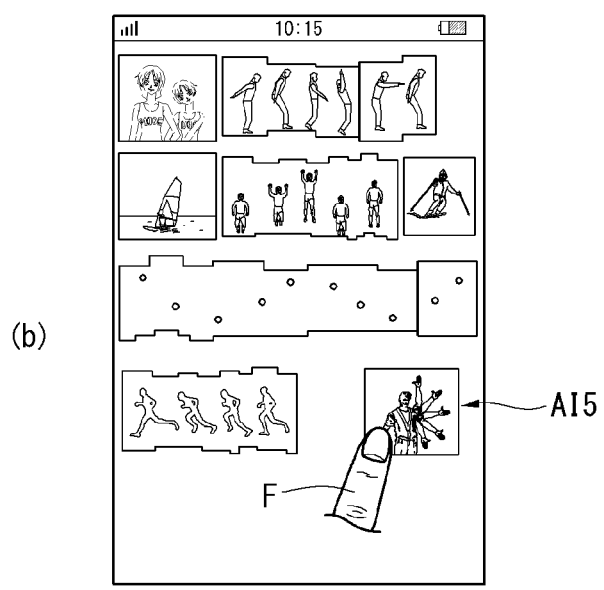
Figure 39:
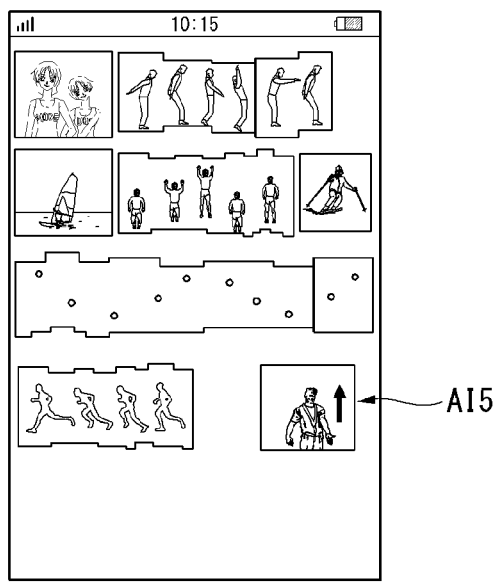
Figure 39:
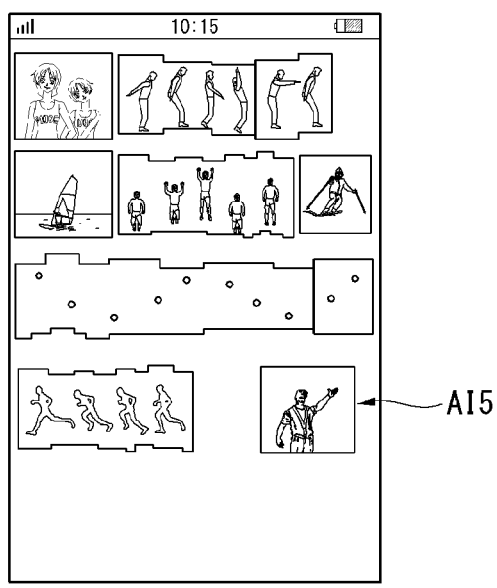

FIGS. 37 to 39 illustrate a method for playing a combined image according to one embodiment of the present invention. As shown in the figures, the controller 180 according to one embodiment of the present invention can play a combined image AI in the image gallery mode. As shown in FIG.

37, a fifth combined image AI5 can be generated by combining first to n-th images (I1 to In) together.

When an object captured in the first to the n-th image (I1 to In) shows little motion, the controller 180 can generate a fifth combined image AI5 by overlapping the first to the n-th image (I1 to In). The fifth combined image AI5 generated from overlapping of the first to the n-th image (I1 to In) may have the size similar to that of an image photographed by a conventional method. However, a motion trail RI due to motion of the photographed object can be displayed.

As shown in FIG. 38(a), the fifth combined image AI5 can be displayed together with other thumbnails in the image gallery mode. As shown in FIG. 38(b), the user can touch the fifth combined image AI5 by using his or her finger F. For example, the user can perform a touch motion of touching the fifth combined image AI5 and dragging the fifth combined image to the left or right.

As shown in FIG. 39(a), if a touch input of the user is received, the controller 180 can carry out a display operation on the fifth combined image AI5 in response to the touch input. For example, the controller 180 can display overlapping images one after another. If the overlapping images are displayed sequentially, the user can see an animation effect from the images like a video. As shown in FIG. 39(b), if a touch motion of the user ends, the controller 180 can display the fifth combined image AI5 corresponding to the end point. If the user's touch input is received again at that moment, play of the fifth combined image AI5 is resumed to display the image from the end point.

Figure 40:
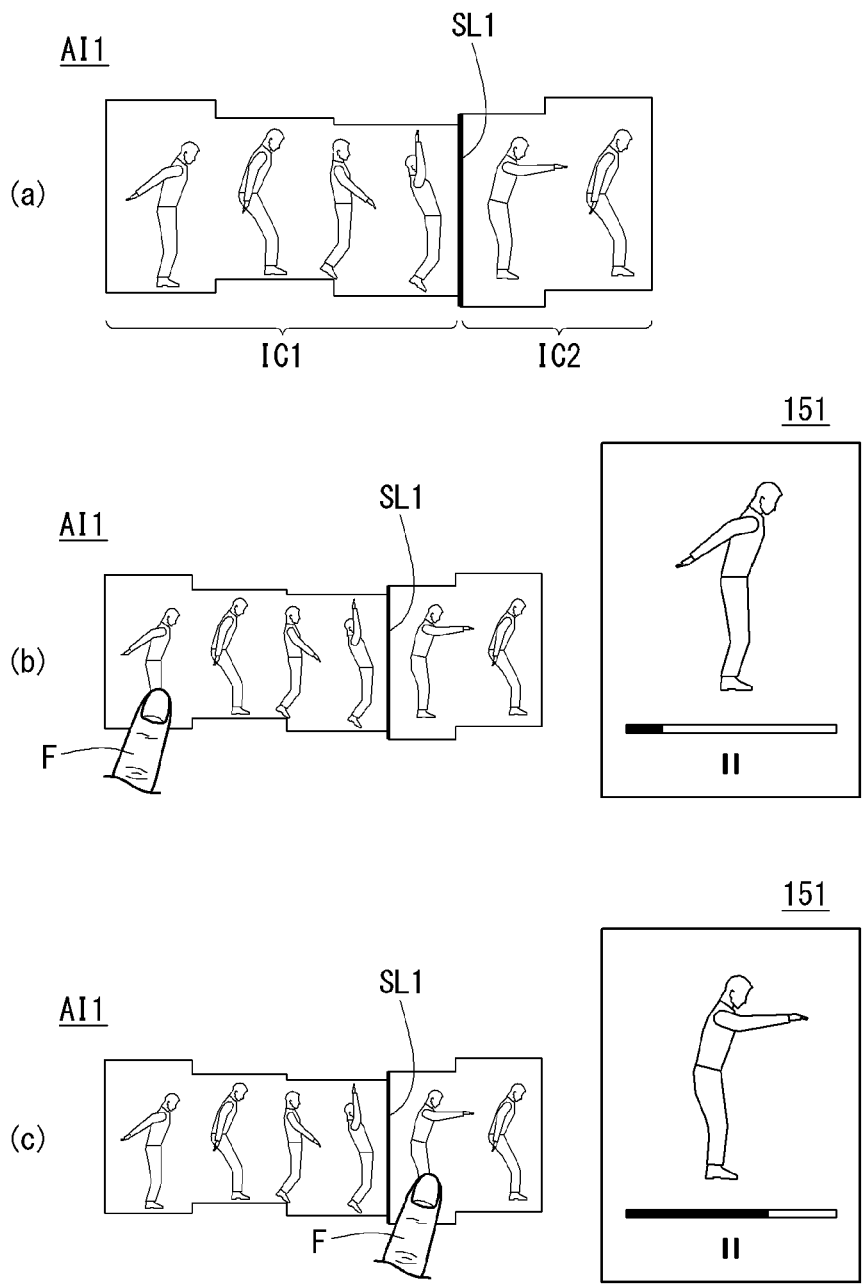
FIG. 40 illustrates a method for playing a combined image according to one embodiment of the present invention.

FIG. 40 illustrates a method for playing a combined image according to one embodiment of the present invention. As shown in the figure, a combined image AI according to one embodiment of the present invention can display part of its image corresponding to the position at which the user's touch input is received.

As shown in FIG. 40(a), a first combined image AI1 can be a combination of a first image cluster IC1 and a second image cluster IC2. An identifier SL displayed on the first image cluster. All indicates that multiple image clusters have been combined together. As shown in FIG. 40(b), the user can touch the first combined image AI1 by using his or her finger F. In the figure, it is assumed that the user touches the first combined image AI1.

When a touch position is on the first image cluster IC1, the controller 180 can control the display unit 151 to display the first image cluster IC1 from the first image thereof. For example, images constituting the first image cluster IC1 can be displayed sequentially. If the images are displayed with relatively short intervals, the user can feel as if he or she is watching a video.

As shown in FIG. 40(e), the user can touch a second combined image AI2 by using his or her finger F. In this instance, a touch position can be on a second image cluster IC2. When a touch position is on the second image cluster IC2, the controller 180 can control the display unit 151 to display the second image cluster IC2 from the first image thereof. In other words, part of the images constituting the first combined image AI1 corresponding to the first image cluster IC1 is skipped and only the part corresponding to the second image cluster IC2 can be displayed. Since the user can select pan of the image to be displayed with respect to the identifier SL, the user can make selection more intuitively.

Figure 41:
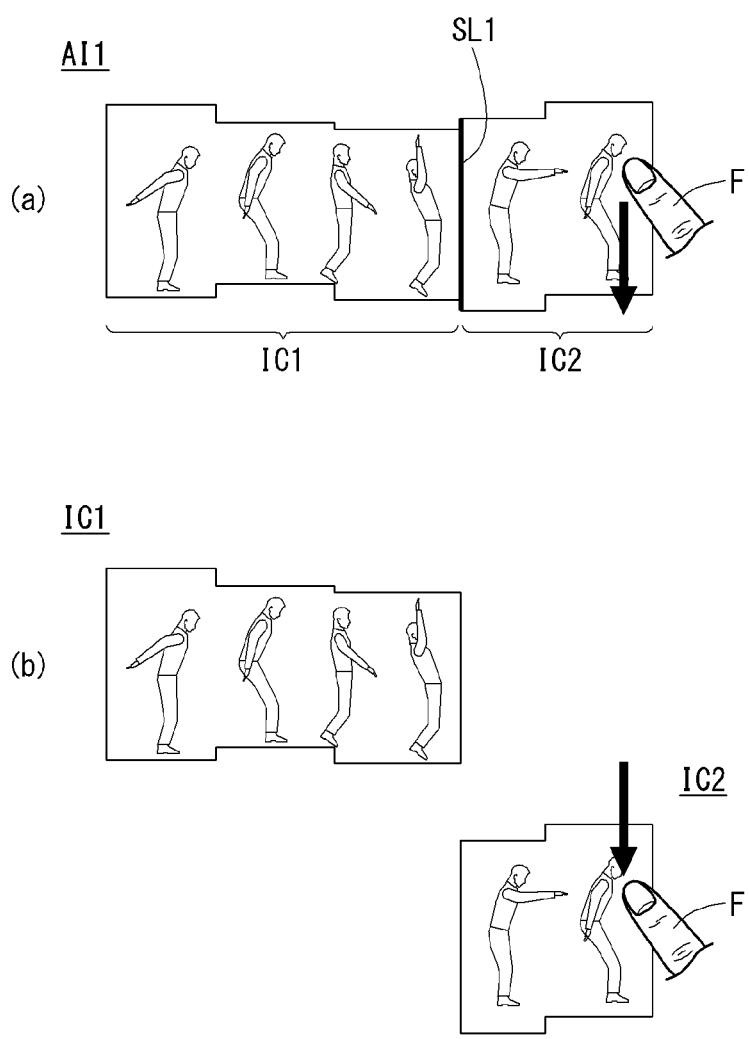
FIGS. 41 and 42 illustrate a method for manipulating a combined image according to one embodiment of the present invention.
Figure 42:
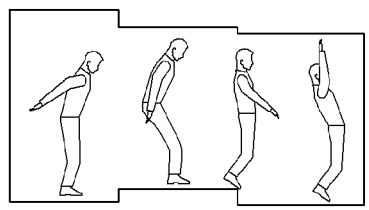
Figure 42:
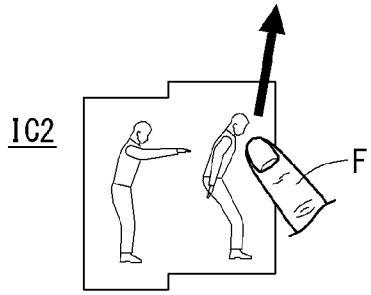
Figure 42:
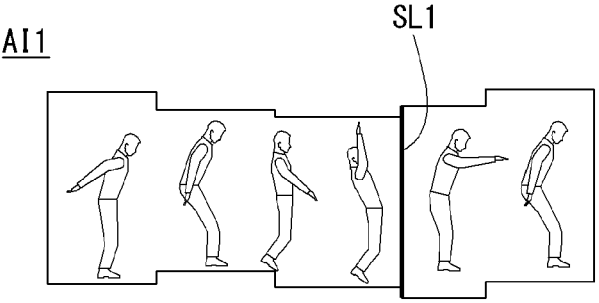

FIGS. 41 and 42 illustrate a method for manipulating a combined image according to one embodiment of the present invention. As shown in the figures, the controller 180 according to one embodiment of the present invention can edit a combined image AI in response to touch motion of the user.

As shown in FIG. 41(a), a first combined image AI1 can consist of a first image cluster IC1 and a second image cluster IC2. The controller 180 can receive a touch motion of the user touching and dragging a particular image cluster. For example, the user may touch the second image cluster IC2 and drag the second image cluster IC2 in a downward direction.

As shown in FIG. 41(b), if touch motion of dragging the second image cluster IC2 is received, the controller 180 can carry out an operation of separating the second image cluster IC2 from the first image cluster IC1. In other words, the controller 180 can separate the second image cluster IC2 in response to the user's dragging motion to manage the second image cluster IC2 as a separate image file in an image gallery.

As shown in FIG. 42(a), the image gallery can include the first IC1 and the second image cluster IC2. The user, by using his or her finger F, can drag the second image cluster IC2 to move onto the first image cluster IC1. As shown in FIG. 42(b), the controller 180 can generate a first combined image AI1 combining the first IC1 and the second image cluster IC2 together in response to the dragging motion to overlap the two image clusters with each other.

Figure 43:
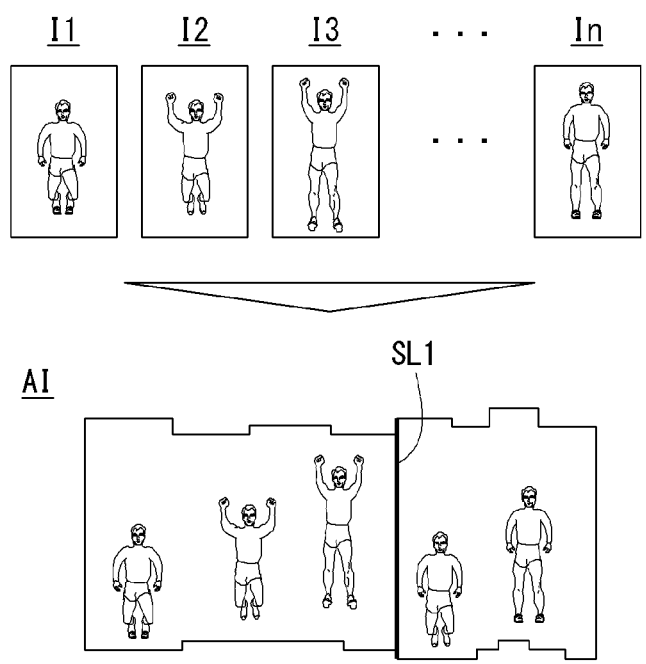
FIG. 43 illustrates an image capacity according to one embodiment of the present invention.

FIG. 43 illustrates an image capacity according to one embodiment of the present invention. As shown in the figure, a mobile terminal 100 according to one embodiment of the present invention can adjust image size according to an employed method. The controller 180 can shoot first to n-th images (I1 to In) by using the camera 121 based on the user's operation thereof. The first to the n-th image (I1 to In) can be the images captured continuously within a relatively short time period.

The controller 180 can generate a combined image AI by using the first to the n-th image (I1 to In). In other words, the combined image AI can be a set of the first to the n-th image (I1 to In). The total capacity of the first to the n-th image (I1 to In) may differ from that of the combined image AI. For example, the controller 180 can reduce the overall space by using a method of removing overlapping parts of images while combining the images together. Through this method, even a combined image AI generated by using tens to hundreds of images can be made to occupy relatively small space.

The above-described method of controlling the mobile terminal may be written as computer programs and may be implemented in digital microprocessors that execute the programs using a computer readable recording medium. The method of controlling the mobile terminal may be executed through software. The software may include code segments that perform required tasks. Programs or code segments may also be stored in a processor readable medium or may be transmitted according to a computer data signal combined with a carrier through a transmission medium or communication network.

The computer readable recording medium may be any data storage device that can store data that can be thereafter read by a computer system. Examples of the computer readable recording medium may include read-only memory (ROM), random-access memory (RAM), CD-ROMs, DVD±ROM, DVD-RAM, magnetic tapes, floppy disks, optical data storage devices. The computer readable recording medium may also be distributed over network coupled computer systems so that the computer readable code is stored and executed in a distribution fashion.

A mobile terminal may include a first touch screen configured to display a first object, a second touch screen configured to display a second object, and a controller configured to receive a first touch input applied to the first object and to link the first object to a function corresponding to the second Object when receiving a second touch input applied to the second object while the first touch input is maintained.

A method may be provided of controlling a mobile terminal that includes displaying a first object on the first touch screen, displaying a second object on the second touch screen, receiving a first touch input applied to the first object, and linking the first object to a function corresponding to the second object when a second touch input applied to the second object is received while the first touch input is maintained.

Any reference in this specification to "one embodiment," "an embodiment," "example embodiment," etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A mobile terminal, comprising:
a display unit;
at least one camera; and
a controller configured to:
perform a single shooting operation using the at least one camera for capturing an ordinary image,
perform a continuous shooting operation using the at least one camera for capturing a plurality of images in the continuous shooting operation,
generate an image cluster by combining overlapping portions among the plurality of images, and
display thumbnails including at least one thumbnail of the image cluster and at least one thumbnail of the ordinary image in an image gallery mode,
wherein at least one of a size and shape of the at least one thumbnail of the image cluster is different from at least one of a size and shape of the at least one thumbnail of the ordinary image according to states of images constituting the image cluster.

2. The mobile terminal of claim 1, wherein the controller is further configured to change at least one of at least one shooting speed of the continuous shooting operation or at least one of a number of times for continuous shooting of the continuous shooting operation according to a touch input on the display unit.

3. The mobile terminal of claim 1, wherein the state of an image includes at least one of a number of images forming the image cluster or a degree of motion of an object included in the image.

4. The mobile terminal of claim 1, wherein the controller is further configured to:
display a part of a thumbnail of the image cluster according to a size of the image cluster on the display unit, and
display another part of the thumbnail subsequently to the part of the thumbnail on the display unit according to a touch input.

5. A method of controlling a mobile terminal, the method comprising:
performing a single shooting operation using at least one camera for capturing an ordinary image;
performing a continuous shooting operation using the at least one camera for capturing a plurality of images in the continuous shooting operation;
generating, via a controller, an image cluster by combining overlapping portions among the plurality of images; and
displaying thumbnails including at least one thumbnail of the image cluster and at least one thumbnail of the ordinary image in an image gallery mode,
wherein at least one of a size and shape of the at least one thumbnail of the image cluster is different from at least one of a size and shape of the at least one thumbnail of the ordinary image according to states of images constituting the image cluster.

6. The method of claim 5, further comprising:
changing at least one of at least one shooting speed of the continuous shooting operation or at least one of a number of times for continuous shooting of the continuous shooting operation according to a touch input on the display unit.

7. The mobile terminal of claim 1, wherein the controller is further configured to:
perform first and second continuous shooting operations using the at least one camera for capturing a plurality of first images in the first continuous shooting operation and capturing a plurality of second images in the second continuous shooting operation,
generate a first image cluster from the plurality of first images and a second image cluster from the plurality of second images,
generate a combined image by combining the first image cluster and the second image cluster, and
distinctively display the first and the second image clusters on the display unit.

8. The mobile terminal of claim 7, wherein the controller is further configured to distinguish the first and the second image cluster from each other in the combined image by indicating an identifier including at least one of a line representing a boundary between the first and the second image clusters or at least one of changes of color, brightness, and chrominance of at least one region of the first and the second image clusters.

9. The mobile terminal of claim 7, wherein the controller is further configured to display at least one image with a different attribute stored in a memory to be distinguished from the combined image.

10. The mobile terminal of claim 7, wherein the controller is further configured to display a plurality of images forming the combined image on the display unit continuously.

11. The mobile terminal of claim 7, wherein the controller is further configured to manipulate an image displayed on the display unit among a plurality of images constituting the combined image in response to a touch input on the combined image.

12. The mobile terminal of claim 11, wherein the manipulation includes at least one of deletion of the displayed image, addition of a new image before or after the displayed image, or change of sharpness of the displayed image.

13. The mobile terminal of claim 7, wherein the controller is further configured to determine whether to generate the combined image combining the first and the second image clusters together based on at least one of a time interval with which the first and the second image cluster are photographed, a degree of commonality of a photographed object in the first and the second image clusters, or a degree of commonality of a photographed background in the first and the second image clusters.

14. The mobile terminal of claim 7, wherein, based on a touch motion on at least one of the first and a second image clusters forming the combined image, the controller is further configured to display on the display unit an image corresponding to the first or second image cluster to which the touch motion has been applied.

15. The mobile terminal of claim 7, wherein, based on a touch motion on at least one of the first and a second image clusters forming the combined image, the controller is further configured to display the first or second image cluster to which the touch motion has been applied separately from the combined image.

16. The mobile terminal of claim 7, wherein the controller is further configured to distinguish the first and the second image clusters from each other in the combined image by indicating an identifier including at least one of a line representing a boundary between the first and the second image clusters or at least one of changes of color, brightness, and chrominance of at least one display region of the first and the second image clusters.

17. The method of claim 5, further comprising:
performing first and second continuous shooting operations using the at least one camera capturing a plurality of first images in the first continuous shooting operation and capturing a plurality of second images in the second continuous shooting operation;
generating, via the controller, a first image cluster from the plurality of first images and s second image cluster from the plurality of second images;
generating, via the controller, a combined image by combining the first image cluster and the second image cluster; and
distinctively displaying the first and the second image clusters on a display unit.

18. The method of claim 17, further comprising:
distinguishing the first and the second image clusters from each other in the combined image by indicating an identifier including at least one of a line representing a boundary between the first and the second image clusters or at least one of changes of color, brightness, and chrominance of at least one display region of the first and the second image clusters.

* * * * *